(12) United States Patent
Deville et al.

(10) Patent No.: US 10,538,461 B2
(45) Date of Patent: Jan. 21, 2020

(54) CERAMIC PRODUCT WITH ORIENTED PARTICLES AND METHOD FOR THE PRODUCTION THEREOF

(71) Applicants: SAINT-GOBAIN CENTRE DE RECHERCHES ET D'ETUDES EUROPEEN, Courbevoie (FR); CENTRE NATIONAL DE LA RECHERCHES SCIENTIFIQUE, Paris (FR)

(72) Inventors: Sylvain Deville, L'Isle sur la Sorgue (FR); Florian Bouville, Baden (CH); Adam Stevenson, Le Thor (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 356 days.

(21) Appl. No.: 15/318,218

(22) PCT Filed: Jun. 11, 2014

(86) PCT No.: PCT/IB2014/062129
§ 371 (c)(1),
(2) Date: Dec. 12, 2016

(87) PCT Pub. No.: WO2015/189659
PCT Pub. Date: Dec. 17, 2015

(65) Prior Publication Data
US 2017/0129816 A1   May 11, 2017

(51) Int. Cl.
*C04B 35/626* (2006.01)
*B28B 1/00* (2006.01)
(Continued)

(52) U.S. Cl.
CPC ........ *C04B 35/62655* (2013.01); *B28B 1/007* (2013.01); *B28B 1/26* (2013.01);
(Continued)

(58) Field of Classification Search
CPC ... B28B 1/007; C04B 38/0605; C04B 38/061; C04B 2235/787
See application file for complete search history.

(56) References Cited

U.S. PATENT DOCUMENTS

| 2,888,737 A | 6/1959 | Robinson |
| 6,177,373 B1 | 1/2001 | Sterte et al. |

(Continued)

FOREIGN PATENT DOCUMENTS

| CN | 101597177 A | 12/2009 |
| CN | 102432327 A | 5/2012 |

(Continued)

OTHER PUBLICATIONS

Oct. 3, 2017 Office Action Issued in U.S. Appl. No. 14/650,486.
(Continued)

*Primary Examiner* — Erin Snelting
(74) *Attorney, Agent, or Firm* — Oliff PLC

(57) ABSTRACT

A method includes the following steps: a) the production of a slip including more than 4% and less than 50% of ceramic particles and including: b) a first particulate fraction including of orientable particles having a median length L'50 and representing more than 1% of the ceramic particles, and c) a second particulate fraction having a median length D50 at least ten times shorter than L'50 and representing more than 1% of the ceramic particles, the first and second particulate fractions together representing more than 80% of all of the ceramic particles, in volume percentages based on the total quantity of ceramic particles; d) oriented freezing of the slip by moving a solidification front at a lower speed than the (Continued)

speed of encapsulation of the ceramic particles; e) elimination of the crystals of the solidified liquid phase of the block; and f) optionally sintering.

22 Claims, 11 Drawing Sheets

(51) Int. Cl.

| | | |
|---|---|---|
| C04B 35/64 | (2006.01) | |
| C04B 35/111 | (2006.01) | |
| C04B 35/495 | (2006.01) | |
| B28B 1/26 | (2006.01) | |
| B28B 11/04 | (2006.01) | |
| C04B 35/638 | (2006.01) | |

(52) U.S. Cl.
CPC ............. *B28B 11/04* (2013.01); *C04B 35/111* (2013.01); *C04B 35/495* (2013.01); *C04B 35/6263* (2013.01); *C04B 35/6264* (2013.01); *C04B 35/638* (2013.01); *C04B 35/64* (2013.01); *C04B 2235/3201* (2013.01); *C04B 2235/3217* (2013.01); *C04B 2235/3255* (2013.01); *C04B 2235/3281* (2013.01); *C04B 2235/3418* (2013.01); *C04B 2235/5472* (2013.01); *C04B 2235/602* (2013.01); *C04B 2235/612* (2013.01); *C04B 2235/77* (2013.01); *C04B 2235/787* (2013.01); *C04B 2235/788* (2013.01)

(56) References Cited

U.S. PATENT DOCUMENTS

| | | | |
|---|---|---|---|
| 6,811,602 B2* | 11/2004 | Beppu .................. | B01D 39/2093 106/600 |
| 2004/0120881 A1 | 6/2004 | Takao et al. | |
| 2007/0249493 A1 | 10/2007 | Kawata et al. | |
| 2010/0099547 A1 | 4/2010 | Fukushima et al. | |
| 2010/0118466 A1 | 5/2010 | Gorzkowski, III et al. | |
| 2010/0200801 A1 | 8/2010 | Ramasamy et al. | |
| 2011/0236625 A1 | 9/2011 | Kikuchi et al. | |
| 2013/0071610 A1* | 3/2013 | Deville .................. | B01J 21/066 428/118 |
| 2013/0105386 A1 | 5/2013 | Deville et al. | |
| 2015/0004521 A1 | 1/2015 | Ramesh et al. | |
| 2015/0290834 A1* | 10/2015 | Klotz ..................... | B28B 1/007 210/510.1 |

FOREIGN PATENT DOCUMENTS

| | | |
|---|---|---|
| EP | 1 253 121 A2 | 10/2002 |
| EP | 2 368 633 A1 | 9/2011 |
| FR | 2 958 288 A1 | 10/2011 |
| FR | 2 999 919 A1 | 6/2014 |
| FR | 2999194 A1 | 6/2014 |
| RU | 2 183 499 C2 | 6/2002 |
| SU | 1532184 A1 | 12/1989 |
| WO | 2013/106118 A2 | 7/2013 |

OTHER PUBLICATIONS

Mar. 9, 2018 Office Action issued in Chinese Application No. 201480081189.X.
Apr. 6, 2018 Office Action issued in Japanese Application No. 2016-572587.
Mar. 29, 2018 Office Action issued in Russian Application No. 2016148404/03(077720).
Philipp M. Hunger and Al:"Platelets self-assemble into porous nacre during freeze casting" Journal of the Mechanical Behavior of Biomedical Materials, vol. 19, Nov. 3, 2013, pp. 87-93, XP055063805.
Nishihara H and Al: "Ordered macroporous silica by ice templating" Chemistry of Materials, American Chemical Society, vol. 17, 2005, pp. 683-689, XP002604921.
Seung-Ho Lee and Al: "Fabrication of Porous PZT-PZN Piezoelectric Ceramics With High Hydrostatic Figure of Merits Using Camphene-Based Freeze Casting," Journal of the American Ceramic Society, vol. 90, No. 9, 2007, pp. 2807-2813, XP055064317.
Etienne Munch et al., "Architectural Control of Freeze-Cast Ceramics Through Additives and Templating," Journal, 2009, pp. 1534-1539, The American Ceramic Society, vol. 97, No. 7.
Florian Bouville et al., "Strong, tough, and stiff bioinspired ceramics from brittle constituents," Article, Nature Materials, Mar. 23, 2014, pp. 1-7, MacMillan Publishers Limited.
Florian Bouville et al., "Templated Grain Growth in Macroporous Materials," Journal, 2014, pp. 1-7, The American Ceramic Society.
Florian Bouville et al., "Lightweight and stiff cellular ceramic structures by ice templating," Article, Jan. 28, 2014, pp. 175-181, vol. 29, No. 2, Materials Research Society.
Preliminary Search Report and Written Opinion issued in French Patent Application No. 12 61786.
Florian Bouville et al., "Self-Assembly of Faceted Particles Triggered by a Moving Ice Front," pp. A-H, American Chemical Society, Langmuir, Jan. 17, 2014.
M. Schehl et al., "Alumina nanocomposites from powder-alkoxide mixtures," Acta Materialia Journals, 2002, pp. 1125-1139, vol. 50, Elsevier Science Limited.
Thomas Waschkies et al., "Control of Lamellae Spacing During Freeze Casting of Ceramics Using Double-Side Cooling as a Novel Processing Route," Journal of the American Society, 2009, pp. S79-S84, vol. 92, No. S1.
Stephen W. Sofie, "Fabrication of Functionally Graded and Aligned Porosity in Thin Ceramic Substrates with the Novel Freeze-Tape-Casting Process," Journal of the American Ceramic Society, Feb. 13, 2007, pp. 1-8, The American Cermaic Society.
U.S. Appl. No. 14/650,486, filed Jun. 8, 2015 in the name of Kaori Sendai.
Jun. 29, 2016 Office Action issued in European Patent Application No. 13824185.6.
Park et al., "The Encapsulation of Particles and Bubbles by an Advancing Solidification Front", J. Fluid Mech., 2006, vol. 560, pp. 415-436.
Mar. 17, 2015 International Search Report in International Patent Application No. PCT/IB2013/060700.
Jul. 10, 2015 International Search Report in International Patent Application No. PCT/IB2014/062129.
U.S. Appl. No. 14/650,486, filed Jun. 8, 2015 in the name of Sylvain Deville.

* cited by examiner

CERAMIC PRODUCT WITH ORIENTED PARTICLES AND METHOD FOR THE PRODUCTION THEREOF

FIELD OF TECHNOLOGY

The invention relates to a process for manufacturing a product, optionally sintered, obtained by oriented freezing of a slip, then removal of the crystals obtained by said freezing. The invention also relates to a product with truncated tubular pores, as well as a dense product obtained from such a product with truncated tubular pores.

PRIOR ART

A product, optionally sintered, obtained by oriented freezing of a slip, then removal of the crystals obtained by said freezing, has truncated tubular pores and is used conventionally in numerous applications, and in particular in a fuel cell, as catalyst support, or in a heat exchanger.

There is a constant need for a product with truncated tubular pores suitable for these applications and displaying low open porosity in the walls of the truncated tubular pores ("macropores"), in order to obtain particularly high mechanical properties.

There is also a need for a dense product having a good compromise between the various mechanical properties, notably between toughness and three-point bend strength.

One aim of the invention is to satisfy these needs, at least partially.

SUMMARY OF THE INVENTION

The invention relates to a process for manufacturing a product, optionally sintered, said process comprising the following steps:
a) preparing a slip comprising an ensemble of ceramic particles in suspension in a liquid phase, the ensemble of ceramic particles representing more than 4% and less than 50% of the volume of the slip and comprising:
   a first particulate fraction consisting of orientable, preferably anisotropic, particles having a median length $L'_{50}$ and representing more than 1% of the ceramic particles, in percentage by volume based on the ensemble of ceramic particles; and
   a second particulate fraction having a median length $D_{50}$ at least ten times less than $L'_{50}$ (i.e. $D_{50}<L'_{50}/10$) and representing more than 1% of the ceramic particles, in percentage by volume based on the ensemble of ceramic particles;
   the first and second particulate fractions together representing more than 80% of the ensemble of ceramic particles, in percentage by volume,
b) optionally, pouring the slip into a mould and/or removing air bubbles contained in the slip,
c) oriented freezing of the slip by displacement of a solidification front so as to form a block of frozen slip, the velocity Vp of the solidification front being less than the velocity of encapsulation of the ceramic particles Vc and adjusted so as to form crystals of solidified liquid phase separated by walls with an average thickness "e" greater than or equal to the average thickness of the orientable ceramic particles $W1_{50}$;
d) optionally, removing said block from the mould,
e) removing the crystals of solidified liquid phase from said block, optionally removed from the mould, preferably by sublimation, so as to obtain a macroporous preform,
f) optionally, removal of binder from the macroporous preform obtained at the end of step e),
g) optionally, sintering the macroporous preform so as to obtain a sintered product;
h) optionally, machining and/or impregnation of said sintered product.

The ceramic particles may be replaced, partially or completely, with equivalent amounts of precursors that are transformed into ceramic particles so as to obtain said ensemble of ceramic particles before step c), and/or
may be replaced, partially or completely, with equivalent amounts of particles of the same form of a ceramic precursor that is transformed into ceramic in step f) or g).

As will be seen in more detail in the rest of the description, the inventors discovered that a process according to the invention makes it possible to manufacture a macroporous preform in which the walls of the macropores comprise, on at least a portion of their thickness, a stack, oriented overall, of orientable ceramic particles. Remarkably, the presence of the particles having a median length $D_{50}$ at least ten times less than $L'_{50}$ improves the apparent density of these walls considerably.

Without being bound to this theory, the inventors explain the particular structure of a product according to the invention on the basis that, as the velocity Vp of displacement of the solidification front is less than the velocity of encapsulation of the ceramic particles, the solidification front pushes back the orientable particles. During their displacement, these orientable ceramic particles become oriented and can thus form a stack roughly following the direction of displacement of the solidification front. During the displacement and orientation of the orientable particles, the particles of the second particulate fraction are progressively trapped in the spaces between the orientable particles. This results in a particularly high apparent density, notably after sintering.

Moreover, especially when the amount of anisotropic ceramic particles is large enough, the inventors found that the particles of the second particulate fraction may, during sintering, coalesce with the neighbouring anisotropic particles to form anisotropic particles of larger size. This results in a surprising stack of anisotropic particles, corresponding to a remarkable apparent density. The sintering step g) is therefore preferred.

Preferably, the orientable ceramic particles are of a material with oriented function. In one embodiment, the form of the orientable particles is selected in relation to the orientation of the function, so that the preferential orientation makes it possible to obtain properties whose intensity is variable depending on the direction considered.

More particularly, a particular arrangement of such orientable particles, for example in the form of a stack, makes it possible to increase the response of a property when this arrangement is correlated with the orientation of the function in said particles. The response may thus be increased, in a preferred plane or direction, as a function of the number of particles having roughly the same orientation.

The oriented function may notably correspond to thermal, electrical, piezoelectric or magnetic properties. Hexagonal boron nitride, graphite, graphene, for example, are ceramic materials whose thermal conductivity is oriented. Hexagonal graphite, graphene, are examples of ceramic materials whose electrical conductivity is oriented. PMN PT, or $(1-x)[Pb(Mg_{1/3}Nb_2/3)O_3]-x[PbTiO_3]$, with x between 0 and 1, $PbTiO_3$, $(Li,Na,K)(Nb,Ta,Sb)O_3$, in particular potassium sodium niobate, are examples of piezoelectric materials. Haematite is an example of ceramic material whose ferromagnetic properties are oriented.

A process according to the invention may further comprise one or more of the following optional features, which may be combined in all possible combinations:

The ensemble of ceramic particles comprises in percentage by volume based on the ensemble of ceramic particles, more than 80% of orientable ceramic particles.

More than 90%, preferably more than 95%, and preferably more than 98%, by number of the particles of the first particulate fraction have a length of less than 70 µm, preferably less than 50 µm, preferably less than 40 µm, and preferably less than 25 µm.

The second particulate fraction represents more than 2%, preferably more than 3%, preferably more than 4%, or even more than 5% of the ceramic particles, in percentage by volume based on the ensemble of ceramic particles.

In one embodiment, more than 90%, preferably more than 95%, and preferably more than 98%, by number of the particles of the second particulate fraction have a length that is at least 5 times, preferably at least 7 times less than $L'_{50}$.

In one embodiment, more than 90%, preferably more than 95%, and preferably more than 98%, by number of the particles of the second particulate fraction have a length that is less than 6 µm, preferably less than 3 µm, preferably less than 1 µm, preferably less than 0.5 µm.

In one embodiment, the ensemble of ceramic particles comprises less than 1%, preferably less than 0.5% of orientable particles with oriented function if the quantity of particles in the second particulate fraction is greater than 5%, in percent by volume based on the ensemble of ceramic particles.

In one embodiment, the ensemble of ceramic particles comprises less than 1%, preferably less than 0.5%, of orientable particles with oriented function, in percent by volume based on the ensemble of ceramic particles.

In a preferred embodiment, the second particulate fraction comprises glass particles. Preferably, the glass particles have a median length $D_{50v}$ at least 50 times less than $L'_{50}$, preferably at least 100 times less than $L'_{50}$, preferably at least 150 times less than $L'_{50}$, preferably at least 200 times less than $L'_{50}$, preferably at least 300 times less than $L'_{50}$. Preferably, the glass particles are selected from the group consisting of silica-based glasses, boron-based glasses, and mixtures thereof. The silica-based glasses may be glasses comprising $SiO_2$, and CaO and/or $Na_2O$ and/or $TiO_2$ and/or $K_2O$ and/or $Al_2O_3$. Preferably, the silica content of the said silica-based glasses is greater than 10%, greater than 20%, greater than 30%, greater than 40%, greater than 50%, greater than 60%, greater than 70%, greater than 80% by mass. Preferably, the silica-based glass contains $SiO_2$, on the one hand, and CaO and/or $Al_2O_3$, on the other hand. Preferably, the silica-based glass contains $SiO_2$ and CaO and $Al_2O_3$. In one embodiment, the $SiO_2$/CaO molar ratio is between 2 and 4, preferably between 2.5 and 3.5, or indeed substantially equal to 3. The boron-based glasses may be glasses comprising $B_2O_3$ and CaO and/or $Na_2O$ and/or $TiO_2$ and/or $K_2O$ and/or $Al_2O_3$. Preferably, the boron content of the said boron-based glasses is greater than 10%, greater than 20%, greater than 30%, greater than 40%, greater than 50%, greater than 60%, greater than 70%, greater than 80% by mass. Preferably, the glass transition temperature of the glass of the said glass particles is between the start of densification temperature and the end of densification temperature, the start and end of densification temperatures being measured on a product obtained by the same process and from the same slip, but which does not comprise any glass particles. The start of densification and end of densification temperatures are measured on a dilatometer and correspond to the temperature at which contraction begins and to the temperature at which contraction ends, respectively. Preferably, in a preferred embodiment, the amount of glass particles is above 0.5%, preferably above 1% in percentage by volume based on the ensemble of ceramic particles. More preferably, the amount of glass particles is below 20%, or even below 15%, or even below 10%, or even below 5%, in percentage by volume based on the ensemble of ceramic particles in suspension. The glass particles may be replaced, partially or completely, with equivalent amounts of glass precursor particles.

In a preferred embodiment, the second particulate fraction comprises ceramic particles that are not glass particles or glass precursor particles. Preferably, the ratio of the amount by volume of particles that are not glass particles or glass precursor particles to the total amount of glass particles and glass precursor particles is above 0.5, preferably above 1 and/or below 4, preferably below 3, preferably below 2.5. More preferably, the median length $D_{50c}$ of the particles that are not glass particles or glass precursor particles is above 0.5 times, preferably above 0.7 times, preferably above 0.8 times the product of the percentage by volume of the second particulate fraction based on the ensemble of ceramic particles and the average thickness of the particles of the first particulate fraction $W1_{50}$ and preferably below 1.5 times, preferably 1.3, preferably 1.2 times said product. Preferably, the median length of the glass particles or glass precursor particles of the second particulate fraction $D_{50v}$ is at least 2 times, preferably at least 4 times, preferably at least 5 times less than the median length of the particles that are not glass particles or glass precursor particles of the second particulate fraction.

The process comprises a step a'), prior to step a), of depositing particle precursors of the second particulate fraction on the surface of the particles of the first particulate fraction. Advantageously, the distribution of the particles of the second particulate fraction within the particulate mixture is improved thereby. The process comprises a sintering step g).

In step c), the ratio of the velocity of the solidification front Vp and the velocity of encapsulation of the ceramic particles Vc, Vp/Vc, is preferably greater than 0.25 and less than 0.7, preferably less than 0.6, preferably less than 0.5.

The process preferably comprises a sintering step g), and in step c), the oriented freezing does not comprise the sequence of an operation of seeding of crystals of linearly solidified liquid phase and an operation of epitaxial growth of said crystals. In an embodiment, in step c), the oriented freezing does not comprise the seeding of crystals of linearly solidified liquid phase. In an embodiment, in step c), the oriented freezing does not comprise an epitaxial growth of crystals of solidified liquid phase. In an embodiment, in step c), during the oriented freezing, the slip is static, i.e. it is not moving, and therefore is not subjected to a shear gradient. Surprisingly, good results are obtained with a simple process.

The process comprises a step g).

The process comprises, preferably after step d), a step e') of compression, following step e), consisting of compressing said block so as to crush the macropores at least partially, preferably completely, preferably in a roughly transverse direction (perpendicular to the direction of the length of the macropores), more preferably, when the macropores are flattened, in a direction roughly parallel to the direction of the thickness of said macropores. Advantageously, a particularly dense product is obtained. The process comprises a sintering step g), the ensemble of ceramic particles comprising less than 80%, in percentage by volume, of orientable ceramic particles.

The process comprises a sintering step g), the ensemble of ceramic particles comprising less than 80%, in percentage by volume, of orientable ceramic particles, preferably anisotropic, the fraction of the non-orientable ceramic particles having a median length less than ten times the median length of the anisotropic ceramic particles.

The orientable ceramic particles are of a material with oriented function.

The first particulate fraction represents more than 50% of the volume of the ceramic particles, and the second particulate fraction represents more than 1%, preferably more than 2%, preferably more than 3%, preferably more than 4%, or even more than 5%, or even more than 7% of the volume of ceramic particles, and more than 90 vol % of the particles of the second particulate fraction are not orientable, and the first and second particulate fractions together represent more than 90% of the volume of the ensemble of ceramic particles, and the granulometric distribution of the ceramic particles is bimodal, the two principal modes corresponding to the first and second particulate fractions, respectively, the process preferably comprising a sintering step g).

The first particulate fraction represents less than 50% and more than 5% of the volume of the ceramic particles, and the first particulate fraction has an average elongation factor, Rm, above 10, and more than 90 vol % of the particles of the second particulate fraction are not orientable, and the first and second particulate fractions together represent more than 90% of the volume of the ensemble of ceramic particles, and the granulometric distribution of the ceramic particles is bimodal, the two principal modes corresponding to the first and second particulate fractions, respectively, the process preferably comprising a sintering step g).

The first particulate fraction represents more than 80% of the volume of the ceramic particles, and the particles of the first particulate fraction are of a material with oriented function, and the second particulate fraction represents less than 20% of the volume of the ensemble of ceramic particles, and more than 90 vol % of the particles of the second particulate fraction are not orientable, and the first and second particulate fractions together represent more than 90% of the volume of the ensemble of ceramic particles, and the granulometric distribution of the ceramic particles is bimodal, the two principal modes corresponding to the first and second particulate fractions, respectively, the process preferably comprising a sintering step g).

The first particulate fraction represents less than 50% and more than 5% of the volume of the ceramic particles, and the particles of the first particulate fraction are of a material with oriented function, and more than 90 vol % of the particles of the second particulate fraction are not orientable, and the first and second particulate fractions together represent more than 95% of the volume of the ensemble of ceramic particles, and the granulometric distribution of the ceramic particles is bimodal, the two principal modes corresponding to the first and second particulate fractions, respectively, the process comprising a sintering step g).

The first particulate fraction represents less than 15% of the volume of the ceramic particles, and more than 95 vol % of the particles of the second particulate fraction are not orientable.

The orientable ceramic particles are anisotropic particles or multifaceted particles having more than two facets.

More than 50% of the orientable particles belong to one and the same shape class, in percentage by volume.

The material constituting the orientable, or anisotropic, ceramic particles and/or the ceramic particles of the second particulate fraction and/or the particles of the fraction complementary to the orientable particles or to the anisotropic particles is selected from oxides, nitrides, carbides, carboxynitrides, graphite, graphene and mixtures thereof.

Said material is selected from the group comprising zirconium oxide or zirconia ($ZrO_2$), partially stabilized zirconium oxide, stabilized zirconium oxide, yttrium oxide ($Y_2O_3$), doped yttrium oxide, preferably yttrium oxide doped with samarium oxide, titanium dioxide ($TiO_2$), aluminosilicates such as mullite, cordierite ($Al_3Mg_2AlSi_5O_{18}$), aluminium oxide or alumina ($Al_2O_3$), hydrated aluminas, and in particular boehmite, magnesium oxide (MgO), talc ($Mg_3Si_4O_{10}(OH)_2$), nickel oxide (NiO), the iron oxides (FeO, $Fe_2O_3$, $Fe_3O_4$), cerium oxide, doped cerium oxide, the oxides with perovskite structure, in particular the gallates, compounds comprising lanthanum of the type $LaAlO_3$ or $LaGaO_3$ or $La_{(1-x)}Sr_xMO_3$, with $0 \leq x \leq 1$ and M an element selected from the group comprising chromium, cobalt, magnesium, iron, gadolinium, manganese and mixtures thereof; the oxides with perovskite structure doped with platinum and/or palladium and/or rhodium and/or gold and/or silver, for example $La_{(1-x)}Sr_x M_{(1-y)}M'_yO_3$ with $0 \leq x \leq 1$, $0 \leq y \leq 0.15$, M being an element selected from the group comprising chromium, cobalt, magnesium, iron, gadolinium, manganese and mixtures thereof, M' being an element selected from the group comprising platinum, palladium, rhodium, gold, silver and mixtures thereof, the compounds comprising titanium of the type $La_4Sr_8Ti_{11}Mn_{1-x}Ga_xO_{38}$ with $0 \leq x \leq 1$ and $La_4Sr_8Ti_{12-n}Mn_nO_{38}$ with $0 \leq n \leq 1$, the compounds of the type $BaTiO_3$, $BaZrO_3$, $(1-x)[Pb(Mg_{1/3}Nb_{2/3})O_3]-x[PbTiO_3]$, with x between 0 and 1, $Pb(Mg_{0.25}Nb_{0.75})O_3$, $Ba(Zn_{0.25}Nb_{0.75})O_3$, $Pb(Zn_{0.25}Nb_{0.75})O_3$, $PbTiO_3$, $CaCu_3Ti_4O_{12}$, the compounds with a structure of the bimevox type, for example $Bi_2V_{1-x}Me_xO_z$ with $0 \leq x \leq 1$, z such as to ensure electroneutrality, and Me an element selected from the group comprising magnesium, aluminium, silicon, titanium, cobalt, nickel, copper, zinc, manganese, antimony, tantalum, niobium, chromium, molybdenum, tungsten, uranium and mixtures thereof, the compounds with a structure of the lamox type, for example $La_2Mo_2O_9$, the compounds with apatite structure, for example $Me'_{10}(XO_4)_6Y'_2$ in which Me' is a metal cation selected from the group comprising $Ca^{2+}$, $Cd^{2+}$, $Sr^{2+}$, $Ba^{2+}$, $Pb^{2+}$, $Na^+$, $K^+$, cations of rare earths, preferably $La^{3+}$ and $Nd^{3+}$, $Al^{3+}$, $U^{4+}$, $Th^{4+}$, $(XO_4)$ is an anionic group selected from $PO_4^{3-}$, $SiO_4^{4-}$, $AsO_4^{3-}$, $MnO_4$, $SO_4^{2-}$, $CO_3^{2-}$, $HPO_4^{2-}$, $SiO_4^{4-}$, $GeO_4^{4-}$ and mixtures thereof, and Y' is an anion selected from $F^-$, $Cl^-$, $OH^-$, $Br^-$, $F^-$, $CO_3^{2-}$, $O^{2-}$ and mixtures thereof, the compounds of type $SrCe_{1-x}M_xO_3$ with $0 \leq x \leq 1$ and M a rare earth, M preferably being ytterbium, the compounds of the type $BaCe_{1-x}M_xO_3$, with $0 \leq x \leq 1$ and M a rare earth, for example the compound $BaCeO_3$, the compounds of the family $La_xSr_{1-x}ScO_3$ with $0 \leq x \leq 1$, for example $La_{0.9}Sr_{0.1}ScO_3$, the zeolites of structure $Na_{x1}Ca_{x2}Mg_{x3}Ba_{x4}K_{x5}Al_{x6}(Si_{x7}O_{x8}),x9H_2O$, x1 to x9 being positive integers or zero fulfilling the following conditions: x6>0, x7>0, x8>0, x9>0 and x1+x2+x3+x4+x5>0, $(Li,Na,K)(Nb,Ta,Sb)O_3$, $KNbO_3$ optionally doped preferably with lithium and/or tantalum and/or barium, $NaNbO_3$ optionally doped preferably with lithium and/or tantalum and/or barium, $(K_{0.5}Na_{0.5})NbO_3$ optionally doped preferably with lithium and/or tantalum and/or barium, haematite, aluminium nitride, boron nitride, preferably hexagonal boron nitride, silicon nitride, titanium nitride, titanium carbide, silicon carbide, tungsten carbide, zirconium carbide, graphite, graphene and mixtures thereof.

The invention also relates to a preform obtained or that can have been obtained at the end of a process comprising steps a) to e) above.

The invention also relates to a product obtained or that can have been obtained by a process according to the invention.

The present invention also relates to a product, optionally sintered, comprising a plurality of macroscopic truncated tubular pores extending roughly parallel to one another in a longitudinal direction, each truncated tubular pore being delimited by a wall, the walls between said truncated tubular pores comprising more than 5%, in percentage by volume, of orientable ceramic grains and having an apparent porosity below 50%, preferably below 40%, preferably below 30%, preferably below 20%, or even below 10%.

As will become clear in the rest of the description, a process according to the invention leads to orientation of the orientable ceramic particles during product manufacture. The orientable grains of the product, corresponding to the orientable particles of the slip, are thus oriented.

Preferably, a product according to the invention further comprises one, and preferably several, of the following optional features:

The walls have an open porosity below 30%.

The walls comprise a peripheral stratum consisting of one or more layers of orientable ceramic grains.

The dispersion of the orientation of the grain boundaries is below 30°, preferably below 15°.

The invention further relates to a device selected from a ceramic electrochemical cell, a fuel cell, and in particular an SOFC cell, an IT-SOFC cell, a PCFC cell, an element for filtration of a liquid or gaseous fluid, a microstructure for storage used for storing a substance in the macropores, a catalyst support, a heat exchanger, a heat insulator, a fluid distributor allowing said fluid to be transported, and notably a gas distributor, a separator of drops or a trickling unit for an air conditioning system, a battery, and notably an electrolyte of a battery, a supercapacitor, a humidity adsorber, a micro-combustion chamber, a transducer, a movement sensor, an ultrasonography probe, a baking support, a sintering muffle, in particular a muffle used for sintering aluminium nitride (AlN), said device comprising a product according to the invention or manufactured by a process according to the invention. This product may in particular be used as impregnated electrolyte in the aforementioned cells.

In an additional development, the invention relates to a dense product, optionally sintered, obtained by a process according to the invention comprising, after step d), a step e') of compression, following step e), consisting of compressing said block in a direction preferably roughly parallel to the direction of the thickness of the crystals of solidified liquid phase, so as to obtain a dense product according to the invention.

A dense product according to the invention may notably have a relative density above 85%, preferably above 90%, preferably above 95%, comprise in percentage by volume more than 50% of orientable ceramic grains, and optionally comprise more than 5%, in percentage by volume, of orientable ceramic grains having an oriented function, preferably rodlets or platelets, more than 80% of the orientable ceramic grains being roughly parallel to one another.

In one embodiment, more than 50%, more than 70%, more than 80%, more than 90%, more than 99%, more than 99.5%, or even roughly 100%, in percentage by volume, of the orientable ceramic grains are without oriented function.

Preferably, the thickness of the dense product is above 50 µm, preferably above 100 µm, preferably above 500 µm, or even above 1 mm, or even above 5 mm, or even above 1 cm, or even above 5 cm.

Advantageously, a dense product according to the invention has good mechanical properties, notably breaking stress and toughness, especially in comparison with a porous product obtained at the end of step e), f) or g) of a process not comprising step e').

Definitions

"Ceramic material" means any nonmetallic and inorganic material.

"Precursor" of an element means an object that is transformed into said element by the execution of a process according to the invention.

"Velocity of encapsulation of the ceramic particles", Vc, means the velocity of the solidification front, beyond which, during passage of said solidification front, the ceramic particles are no longer pushed back by the solidification front between the crystals of solidified liquid phase, but remain trapped in these crystals of solidified liquid phase.

The velocity of encapsulation of the ceramic particles of a slip depends notably on the amount of particles in suspension in the slip, their size, as well as the viscosity of said slip. There is a simple test for determining this velocity of encapsulation.

The velocity of encapsulation is described for example in "*The encapsulation of particles and bubbles by an advancing solidification front*", Park et al., Journal of Fluid Mechanics, 2006, Vol. 560, pp. 415-436. In particular, FIG. 9 of this publication summarizes the influence of particle size on the velocity of encapsulation.

"Oriented" freezing means freezing carried out progressively in a defined direction.

"Sublimation" is an operation, generally under vacuum, that consists of evaporating solidified liquid phase without melting it.

"Melting" is an operation that consists of melting solidified liquid phase.

"Temporary" means "removed from the product during removal of binder or sintering".

The median cross-section of a particle or of a pore is the section in a transverse plane, i.e. perpendicular to the direction of the length (or "longitudinal direction") of the particle or pore, which extends to mid-length of said particle or said pore. For clarity, the lengths of the particles of the first and second particulate fractions have been referenced L and D, respectively.

"Flattened" describes a pore whose width is more than 5 times, preferably more than 10 times, or even more than 20 times greater than its thickness, the width and thickness being measured in a median cross-section (i.e. perpendicular to the direction of the pore length) of the pore.

"Particles" are the solid elements constituting a powder or in suspension in a slip. In a sol, the dissolved matter therefore does not constitute particles. The structure of a gel, obtained by gelling of a sol, comprises hardly any particles. After forming and in the interests of clarity, the particles of the slip are called "grains". The dimensional characteristics relating to a grain are those of the corresponding particle. In particular, a grain is regarded as "anisotropic" when it corresponds to an anisotropic particle.

A particle is "orientable" when it is oriented in a particular way under the effect of passage of the solidification front. An orientable shape, for example of platelet or rodlet or rice grain, or a multifaceted shape (with number of faces above 2 and below 35) makes an orientable particle. When a multifaceted particle only has two faces, tests have shown that it must be anisotropic to be orientable. There is a simple test for verifying whether a particle is orientable.

A particle (or a grain) is considered to be "multifaceted" when it has at least 2 facets, a facet being a surface delimited by an edge. A "nut" shape is an example of a shape with two facets.

A multifaceted particle (or grain) may in particular be "polyhedral", i.e. delimited on all sides by plane polygons. A multifaceted particle (or grain) may in particular be "regular" polyhedral if all its faces are regular polygons of the same type and if all its vertices are of the same degree. A regular polyhedron has a sphere tangential to each face at its centre. A "cube" is a regular polyhedron comprising 6 square faces.

"Direction of orientation of an orientable particle" is the direction in which the orientable particle is oriented under the effect of passage of the solidification front.

A "shape class" is a fraction that unites the orientable particles having a specified shape, for example which unites all the particles having a platelet shape (regardless of the dimensions of these platelets).

A particle is regarded as "anisotropic" when the elongation factor R between its length L and its thickness $W1$, i.e. $R=L/W1$, is greater than 4.

The "length" L of a particle is its largest dimension observable on a photograph taken in a direction perpendicular to the plane on which said particle rests.

The "width" $W2$ and the "thickness" $W1$ of a particle are the lengths of the major and minor axes, respectively, of the smallest possible ellipse in which the median cross-section of said particle can be inscribed.

A particle has a "rodlet" shape when it meets the following three conditions:
1) $4 \leq L/W \leq 10$ and $W=(W1+W2)/2$,
2) $4 \leq L/W1$, and
3) $W2 < 1.5*W1$.

FIG. 1 shows a schematic diagram of a particle with a rodlet shape.

A particle has a "platelet" shape when it meets the following two conditions:
1) $4 \leq L/W1$, and
2) $W2 \geq 1.5\ W1$, preferably $W2 \geq 2\ W1$.

Preferably, the cross-section of a platelet is roughly constant over the whole length of the platelet, is roughly polygonal and has at least 4 sides.

FIG. 2 shows a schematic diagram of a particle of platelet shape.

Particles in the form of platelets or rodlets therefore differ appreciably from spherical or fibrous shapes, wires, filaments, needles or cubes.

The "median" value of a property of the particles of an ensemble of particles is the value of this property that divides the particles of said ensemble into first and second populations that are equal in number, these first and second populations only comprising particles having a value of said property greater than or equal to, or less than respectively, the median value. For example, the median length of an ensemble of particles is the length dividing the particles into first and second populations equal in number, these first and second populations only comprising particles having a length greater than or equal to, or less than respectively, the median length.

"Tubular pore" means a pore that has the general shape of a tube opening at one of its two ends ("blind pore") or at both ends ("through-pore"). In a product according to the invention, the direction of a truncated tubular pore is qualified as "longitudinal direction" and is a function of the direction of advance of the solidification front.

A truncated tubular pore is called "macroscopic", or is called a "macropore" if it has a median cross-section having an equivalent diameter above 0.15 μm and below 450 μm.

For an ensemble of parallel truncated tubular pores, the average median transverse plane is the plane perpendicular to the direction of the truncated tubular pores and passing, on average for all the pores, at mid-length of said truncated tubular pores, mid-length being defined on average for all the truncated tubular pores.

"Cross-section" of a truncated tubular pore is the section of this pore in a transverse cutting plane. The length of a truncated tubular pore is the dimension measured along its axis, between its two ends.

The "tubular" character of a pore can be determined by observation of photographs of the pores, in particular in perspective or in longitudinal section.

The "equivalent diameter" or "size" of the opening or of a section of a pore is the diameter of a disk of the same area as said opening or said section.

The convexity index Ic of a pore in a transverse cutting plane is the ratio Sp/Sc where Sp denotes the area of the cross-section of the pore, delimited by its perimeter, and Sc denotes the convex surface of this cross-section, i.e. the surface of the convex envelope of this cross-section.

Conventionally, "convex envelope" is the line of closed shape convex outwards, of minimum length and containing the perimeter of said pore, the perimeter denoting conventionally the shape line that closes the pore section. The convex envelope is therefore superposed on the convex or rectilinear portions of the perimeter and follows the chords joining in each case two convex or rectilinear portions separated by a concave portion (viewed from outside). A convex envelope may be compared to the region that would be delimited by a stretched elastic band resting exclusively on the perimeter.

For example, FIG. 10 shows the perimeter 10 of a cross-section of a pore, as well as the convex envelope 12 of this pore. With $S_p$ denoting the surface of the pore, delimited by the perimeter 10, and $S_c$ the convex surface of said pore corresponding to the surface delimited by the convex envelope 12, then the convexity index Ic is equal to $S_p/S_c$. The convexity index Ic is therefore equal to 100% for a circle, an ellipse or an oval, but also for a polygon such as a triangle, a parallelogram, a hexagon, a pentagon. It is less than 100% for the pores, whose perimeter, viewed from outside, has one or more recesses.

FIG. 11 shows a pore whose perimeter has concave portions $16_{1-4}$ and convex portions $14_{1-4}$. In this figure, the convex envelope 12 joins the two convex portions $14_1$ and $14_3$.

The convex portions ($14_{1-2}$) are ignored.

The convexity index Ic may be evaluated with the following, non-limiting method:

The sample to be analysed is infiltrated with a resin, for example an epoxy resin. A slice to be analysed is cut perpendicularly to the direction of solidification, and then polished in order to obtain a good surface condition, said polishing being carried out at least with a paper grade 1200, preferably with a diamond paste. Images are then obtained using a scanning electron microscope (SEM), preferably in a mode using backscattered electrons (BSE mode) in order to obtain very good contrast between the ceramic phase and the resin. Each image has at least 1280×960 pixels, excluding the scale bar. The magnification used is such that the width of the image is between 50 times and 100 times the average pore size. A first image may be recorded based on a visual estimate of the average pore size.

The image is then analysed using the imageJ software, available on the website http://rsbweb.nih.gov/ij/ by the following method:
  open the image in imageJ;
  crop the image ("Crop" function) to remove the scale bar or any other supplementary information present on the image;
  adjust the brightness with the function "Image>Adjust>Brightness/contrast", then click on "Auto";
  digitize the image with the Multithresholder function ("Plugin>Filter>Multithresholder"), then select the "Isodata" mode to fix the threshold making it possible to distinguish the material to be analysed from the infiltrated resin;
  ensure that the pores to be analysed appear properly in black on the image (value 255 for white, 0 for black). If otherwise, invert the image using the "Edit>Invert" function;
  analyse the pores using the "Analyse>Analyse particles" function. The possible parameters for analysis of the pores are as follows: "size min": 0.2×average size of pores measured previously; "size max": none, "exclude on edges" so as not to analyse the pores intercepted by the edges of the image, do not tick the option "include holes";
  check that at least 50 pores have been analysed. If otherwise, analyse other images in such a way that the total number of pores analysed is greater than or equal to 50;
  in the table of results, for each pore, record the solidity index ("solidity");
  classify the pores by increasing solidity index;
  plot the cumulative fraction by number as a function of the solidity index Is.

The solidity index measured in this way gives a very good approximation of the average convexity index Ic.

"Fully stabilized zirconium oxide" means a zirconium oxide having an amount of zirconium oxide in a monoclinic crystallographic form below 1 wt %, the complement consisting of zirconium oxide in a quadratic crystallographic form, stable and/or metastable, and/or cubic.

A material is said to have "oriented function" when it has at least one property, other than mechanical, that is "oriented", i.e. whose intensity is variable depending on the orientation of measurement, in a proportion such that there is at least one direction in which said property is at least 1.1 times higher than the average value of said property in the other directions. Such a property may be for example an electrical, thermal, dielectric, magnetic or else optical property. Thus, a particle in a material with oriented function has at least one property whose intensity is a function of the direction in which measurement of the property is carried out. Alumina and silica are not materials with oriented function, in contrast to boron nitride, whose thermal diffusivity is a function of the direction in which it is measured.

"Direction of function" means a direction in which the characteristic function of a material with oriented function displays an intensity extremum.

By definition, a "bimodal" distribution shows up two categories that are not contiguous having the highest values, called "main peaks" or "principal modes".

Unless stated otherwise, a mean value is an arithmetic mean.

Unless stated otherwise, all the percentages relating to the composition of a slip according to the invention are percentages by volume relative to the volume of the slip.

The percentages by volume of an ensemble of particles correspond to percentages considering the sum of the volumes of each of the particles considered. The sum of these volumes is calculated conventionally by the ratio of the mass of said ensemble of particles divided by the absolute density of the material of said particles. For example, if the second particulate fraction represents less than 20% "of the volume of the ensemble of ceramic particles", or in an equivalent manner "of the volume of the ceramic particles" or "in percentage by volume based on the ensemble of ceramic particles" or "in percentage by volume based on the ceramic particles", the volumes to be compared are the volume of the particles of the powder constituting the second particulate fraction and the volume of the ensemble of ceramic particles.

The "relative density of a product" corresponds to the ratio equal to apparent density of the product divided by the absolute density of the product, expressed as a percentage.

"Apparent density of a product" means, in the sense of the present invention, the ratio equal to the mass of the product divided by the volume occupied by said product. It can be measured by imbibition, according to the principle of hydrostatic buoyancy.

"Absolute density of a product" means, in the sense of the present invention, the ratio equal to the mass of dry matter of said product after grinding to a fineness such that hardly any closed porosity remains, divided by the volume of said mass of dry matter after grinding. It may be measured with a helium pycnometer.

The various characteristics of a product according to the invention may be determined by the methods of characterization used for the examples given below.

BRIEF DESCRIPTION OF THE FIGURES

Other features and advantages of the invention will become clearer on examining the drawings, supplied for purposes of illustration and non-limiting, in which.

Figure 1:
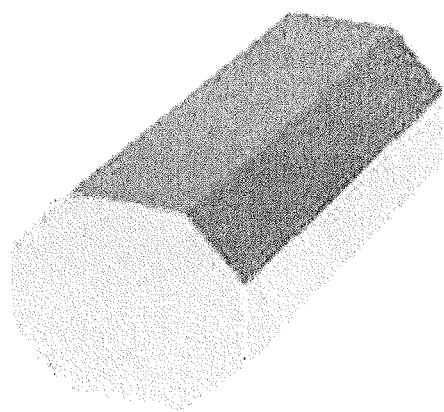
FIGS. 1 and 2 show schematically a rodlet and a platelet, respectively.
Figure 2:
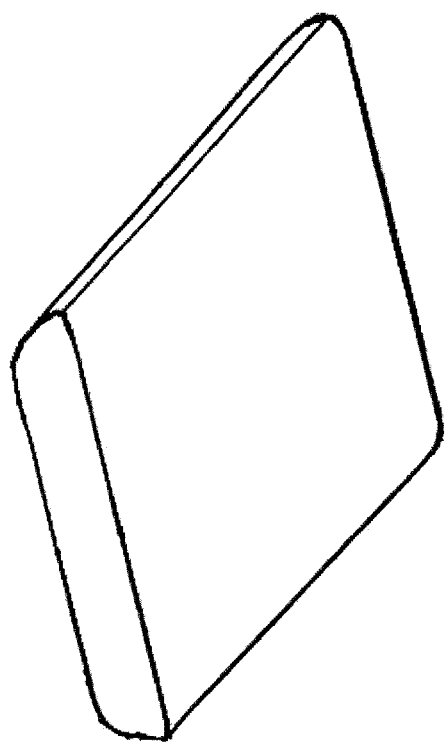

In the figures, identical references have been used to denote identical or similar objects.

DETAILED DESCRIPTION

Process According to the Invention

A product according to the invention may be manufactured by a process comprising steps a) to h) given above.

In step a) of preparing the slip, a suspension of a powder of ceramic particles is prepared.

The amount of particles in suspension is preferably above 8% and/or below 40%, preferably below 25%, in percentage by volume of the slip. The ceramic particles preferably represent more than 90%, preferably more than 95%, or even more than 99%, or even roughly 100% of the volume of the particles in suspension.

In one embodiment, the slip comprises silica, which is preferably to more than 50%, preferably to more than 60%, preferably to more than 70%, preferably to more than 80%, preferably to more than 90%, preferably to more than 95%, preferably to more than 99%, or even roughly completely in the form of particles, in percentages by weight based on the total weight of silica. The ensemble of ceramic particles comprises:

a first particulate fraction consisting of orientable, preferably anisotropic, particles having a median length $L'_{50}$ and representing more than 1% of the ceramic particles, in percentage by volume based on the ensemble of ceramic particles; and a second particulate fraction having a median length $D_{50}$ at least ten times less than $L'_{50}$ (i.e. $D_{50}<L'_{50}/10$) and representing more than 5% of the ceramic particles, in percentage by volume based on the ensemble of ceramic particles.

The first particulate fraction consists of orientable, preferably anisotropic, particles, but does not necessarily comprise all the orientable, or anisotropic, particles of the ensemble of ceramic particles.

The first particulate fraction consists of orientable, preferably anisotropic, particles but does not necessarily represent all the orientable, or anisotropic, particles, respectively, of the ensemble of ceramic particles. According to the invention, there must be at least one such first particulate fraction, but there may be several of them. A first particulate fraction must nevertheless represent more than 1% of the ensemble of ceramic particles.

Moreover, the second particulate fraction consists of any particles, which, together, must have a median length $D_{50}$ at least ten times less than $L'_{50}$. According to the invention, there must be at least one such second particulate fraction, but there may be several of them. A second particulate fraction must nevertheless represent more than 5% of the ensemble of ceramic particles.

The first particulate fraction preferably represents more than 2%, preferably more than 3%, preferably more than 5%, by volume of the ceramic particles, or even of the orientable ceramic particles, or even of the anisotropic ceramic particles. The proportion of the first particulate fraction is not, however, limited to these ranges and this proportion may be above 10%, above 20%, above 30%, above 40%, above 50%, above 60%, above 70%, above 80%, or above 90%, or even 100% by volume of the ceramic particles, or of the orientable ceramic particles, or of the anisotropic ceramic particles.

The second particulate fraction has a median length $D_{50}$ preferably at least fifteen times less than $L'_{50}$, preferably at least twenty times less than $L'_{50}$, preferably at least thirty times less than $L'_{50}$, preferably at least fifty times less than $L'_{50}$.

The second particulate fraction may in particular be included in the first particulate fraction.

The proportion of the second particulate fraction may preferably be above 7%, preferably above 10%, preferably above 15%, or even above 20%, above 30%, above 40%, above 50%, above 60%, above 70%, above 80%, above 90%, above 95%, above 98%, in percentage by volume of the ceramic particles, or even of the orientable ceramic particles, or even of the anisotropic ceramic particles.

The proportion of the second particulate fraction may be above 7%, above 10%, preferably above 15%, or even above 20%, above 30%, above 40%, above 50%, above 60%, above 70%, above 80%, above 90%, above 95%, above 98%, in percentage by volume of the non-anisotropic ceramic particles.

In one embodiment, the first and second particulate fractions are determined so that together they represent more than 90%, more than 95%, or even 100% of the ensemble of ceramic particles, in percentage by volume. The complement to 100% preferably consists of ceramic particles having a median length less than, preferably 2 times less than, 5 times less than the median length $L'_{50}$ of the first particulate fraction.

In one embodiment, the first particulate fraction unites the ensemble of orientable or anisotropic particles, and the second particulate fraction unites the ensemble of particles having a length D at least five times, preferably at least ten times, or even at least fifteen times less than $L'_{50}$.

In one embodiment, the first particulate fraction unites the ensemble of orientable or anisotropic particles, and the second particulate fraction only comprises particles that are not orientable, or even not anisotropic. Preferably, the median length $D_{50}$ is at least twelve times less than $L'_{50}$, preferably at least fifteen times less than $L'_{50}$, preferably at least twenty times less than $L'_{50}$, preferably at least thirty times less than $L'_{50}$, preferably at least fifty times less than $L'_{50}$.

In one embodiment,
the first particulate fraction consisting of orientable, preferably anisotropic, particles represents more than 50%, preferably more than 60%, preferably more than 70%, preferably more than 80%, or even more than 90%, by volume of the ceramic particles, and the second particulate fraction preferably represents more than 7%, preferably more than 10%, preferably more than 15%, by volume of ceramic particles, and more than 90%, more than 95%, or even roughly 100% by volume of the particles of the second particulate fraction are preferably not anisotropic, or even not orientable, and the first and second particulate fractions together represent preferably more than 90%, preferably more than 95%, or even 100% of the volume of the ensemble of ceramic particles, and the granulometric distribution of the ceramic particles is bimodal, the two modes being centred on the lengths $D_a$ and $D_b$, $D_a$ preferably being less than $D_b/10$, $D_b$ and $D_a$ preferably being centred on the lengths $L'_{50}$ and $D_{50}$, respectively.

In this embodiment, the process preferably comprises a sintering step g).

In one embodiment,
the first particulate fraction consisting of orientable, preferably anisotropic, particles represents less than 50%, preferably less than 30%, preferably less than 15% and more than 5%, by volume of the ceramic particles, and the first particulate fraction has an average elongation factor, Rm, preferably greater than 10, or even greater than 15, and more than 90%, more than 95%, or even roughly 100% by volume of the particles of the second particulate fraction are preferably not anisotropic, or even not orientable, and the first and second particulate fractions together represent preferably more than 95%, or even 100% of the ensemble of ceramic particles, and the granulometric distribution of the ceramic particles is bimodal, the two modes being centred on the lengths $D_a$ and $D_b$, $D_a$ preferably being less than $D_b/10$, $D_b$ and $D_a$ preferably being centred on the lengths $L'_{50}$ and $D_{50}$, respectively.

In this embodiment, the process preferably comprises a sintering step g).

In one embodiment,
the first particulate fraction consisting of orientable, preferably anisotropic, particles represents more than 80%, preferably more 90%, by volume of the ceramic particles, and the particles of the first particulate fraction are of a material with oriented function, and the second particulate fraction represents less than 20%, preferably less than 15%, preferably less than 10%, of the volume of the ensemble of ceramic particles, and more than 90%, more than 95%, or even roughly 100% by volume of the particles of the second particulate fraction are preferably not anisotropic, or even not orientable, and the first and second particulate fractions together represent preferably more than 90%, preferably more than 95%, or even 100% of the volume of the ensemble of ceramic particles, and the granulometric distribution of the ceramic particles is bimodal, the two modes being centred on the lengths $D_a$ and $D_b$, $D_a$ preferably being less than $D_b/10$, $D_b$ and $D_a$ preferably being centred on the lengths $L'_{50}$ and $D_{50}$, respectively.

In this embodiment, the process preferably comprises a sintering step g).

In one embodiment,
the first particulate fraction consisting of orientable, preferably anisotropic, particles represents less than 50%, preferably less than 30%, preferably less than 15% and more than 5%, by volume of the ceramic particles, and the particles of the first particulate fraction consisting of orientable, preferably anisotropic, particles are of a material with oriented function, and more than 90%, more than 95%, or even roughly 100% by volume of the particles of the second particulate fraction are preferably not anisotropic, or even not orientable, and the first and second particulate fractions together represent preferably more than 95%, or even 100% of the volume of the ensemble of ceramic particles, and the granulometric distribution of the ceramic particles is bimodal, the two modes being centred on the lengths $D_a$ and $D_b$, $D_a$ preferably being less than $D_b/10$, $D_b$ and $D_a$ preferably being centred on the lengths $L'_{50}$ and $D_{50}$, respectively.

In this embodiment, the process comprises a sintering step g).

Orientable Particles

In one embodiment, the amount of orientable, or even anisotropic, particles is below 50%, preferably below 30%, preferably below 15% based on the volume of the ensemble of ceramic particles. Advantageously, transformation, during sintering, of the particles of the second particulate fraction that are not orientable or anisotropic, into orientable or anisotropic particles, respectively, is promoted thereby. The shape of the latter may be similar to that of the surrounding orientable, or anisotropic, particles. As will be seen in more detail in the rest of the description, this results in a remarkable increase in the apparent density of the walls of the macropores and/or a remarkable change in the properties, the intensity of which is variable as a function of the direction considered when the orientable, preferably anisotropic, particles formed after sintering are of a material with oriented function.

In one embodiment, the granulometric distribution of the ceramic particles is bimodal, the two modes being centred on lengths $D_a$ and $D_b$, respectively, $D_a$ preferably being less than $D_b/10$.

In a preferred embodiment, $D_b$ is equal to $L'_{50}$ and $D_a$ is equal to $D_{50}$.

Preferably, the fraction of the non-anisotropic, or even non-orientable, ceramic particles has a median length less than ten times the median length of the anisotropic, or even orientable ceramic particles respectively, $L_{50}$, especially if the ensemble of ceramic particles comprises less than 80%, in percentage by volume, of anisotropic, or orientable, ceramic particles respectively.

In one embodiment, the granulometric distribution of the orientable, or even anisotropic, ceramic particles is bimodal, the two modes being centred on lengths $L_a$ and $L_b$, respectively, $L_a$ preferably being less than $L_b/10$. In one embodiment, $L_b$ is equal to $L'_{50}$ and $L_a$ is equal to $D_{50}$.

The median length of the orientable, preferably anisotropic, ceramic particles or of the particles of the first particulate fraction, is preferably above 0.1 µm, preferably above 0.2 µm, preferably above 0.3 µm, preferably above 0.5 µm, preferably above 1 µm and/or below 50 µm, preferably below 30 µm, preferably below 25 µm, preferably below 10 µm, or even below 5 µm, or even below 1 µm.

The average thickness of the orientable, preferably anisotropic, particles or even of the particles of the first particulate fraction, $W1_{50}$ is preferably above 0.02 µm, preferably above 0.05 µm, preferably above 0.1 µm, preferably above 0.3 µm and/or below 20 µm, preferably below 10 µm, preferably below 5 µm, preferably below 3 µm, or even below 2 µm, or even below 1 µm.

The average elongation factor of the ensemble of orientable, preferably anisotropic, ceramic particles or even of the particles of the first particulate fraction, Rm (arithmetic mean of the elongation factors R, for the ensemble of orientable, or anisotropic, ceramic particles respectively) is preferably above 10, or even above 15 and/or is below 900, or even below 500, or even below 200.

In one embodiment, $Rm \leq 15$, especially when $W2_{50} < 1.5 \cdot W1_{50}$.

In a preferred embodiment, more than 50%, more than 70%, more than 90%, more than 95%, or even roughly 100% by number of the orientable ceramic particles, or even of the particles of the first particulate fraction, are platelets.

The orientable multifaceted particles of the ensemble of ceramic particles, or even of the particles of the first particulate fraction, comprise preferably less than 30 facets, preferably less than 20 facets, preferably less than 15 facets, or even less than 10 facets, and/or preferably more than 3 facets, preferably more than 4 facets.

The orientable multifaceted particles of the ensemble of ceramic particles, or even of the particles of the first particulate fraction, are preferably selected from cubes, sawtooth fibres, prismatic chains, pseudo-cubo-octahedra, square cylinders, tetrapods, pointed tetrapods, octapods, truncated cubes, cubo-octahedra, truncated octahedra, octahedra, pseudo-octahedra, stars, pillars, icosahedra, hexagonal cylinders, platelets, lenses, triangular platelets, microprisms, hexagonal bipyramids, microtubes, rodlets and mixtures thereof.

Preferably, in step a), more than 80%, preferably more than 90%, preferably more than 95% by number of the orientable, or even anisotropic ceramic particles, or even of the particles of the first particulate fraction, may be classified in less than 5, preferably less than 4, preferably less than 3 shape classes, preferably one shape class, a shape class combining the ensemble of orientable particles having a specified shape.

Preferably, only one powder of orientable particles having the same shape, for example a powder of particles in the form of platelets, is introduced into the slip.

Conventionally, a shape class corresponds to one source of raw material, for example a powder of platelets of boron nitride. The preferred limitation of the number of shape classes therefore signifies that the shape of the orientable, or even anisotropic particles, is not random, most of these particles having a shape selected from a "catalogue" of shapes limited to 5 shapes at most.

In one embodiment, more than 50%, more than 60%, more than 70%, more than 80%, more than 90%, or even roughly 100%, in percentage by volume, of the orientable, or even anisotropic particles, or even of the particles of the first particulate fraction, belong to one and the same shape class.

Preferably, the particles of one shape class are manufactured by the same manufacturing process and consist of the same material.

Preferably, the smallest angle between the direction of orientation of the orientable particles and at least one function direction is roughly constant. It may be below 25°, or even below 10°, or even below 5°, preferably roughly zero. As a variant, it may be greater than 650, or even greater than 80°, or even greater than 85°, preferably roughly equal to 900°.

Orientable Particles of a Material with Oriented Function

In one embodiment, the particles of the first particulate fraction, or even the anisotropic ceramic particles, or even the orientable ceramic particles, or even all the ceramic particles, are of a material with oriented function.

Preferably, said material with oriented function has at least one property, other than mechanical, such that there is at least one direction in which said property is at least 1.2 times, preferably 1.5 times, preferably 2 times, preferably 3 times, preferably 5 times, or even 10 times, greater than the average value of said property in the other directions.

The oriented function may notably correspond to thermal, electrical, piezoelectric or magnetic properties. Preferably, the shape of the orientable particles is selected so that the orientation of these particles resulting from the freezing step c) results in orienting the oriented function in a preferred direction or plane, i.e. to increase or decrease this function in this direction or this plane.

Moreover, the number or the density of oriented particles thus allows the intensity of said property to be varied.

For example, there are materials with oriented function for which the thermal conductivity is different depending on the direction considered, and maximum along a particular plane, for example particles of boron nitride. Such particles may be in the form of platelets, the thermal conductivity being maximum in the general plane of the platelets. A wall consisting of a stack of such platelets so that the planes of maximum conductivity of the particles are roughly parallel thus allows maximum diffusion of heat in the wall along these planes.

There are also orientable particles for which the piezoelectric response is different depending on the direction considered, and maximum along a particular plane, notably particles of potassium sodium niobate. A wall consisting of a stack of these particles such that the planes of maximum piezoelectric response of the particles are roughly parallel can thus favour this response in the wall along these planes.

Particles of the Second Particulate Fraction

The particles of the second particulate fraction may be, completely or partially, orientable or non-orientable, anisotropic or non-anisotropic.

In one embodiment, the second particulate fraction preferably represents more than 80%, more than 90%, or even more than 95% of the ceramic particles.

Fraction Complementary to the Orientable Particles or to the Anisotropic Particles The fraction of the ceramic particles complementary to the orientable particles or to the anisotropic particles may consist, completely or partially, of particles of the second particulate fraction, but also of coarser particles.

The median length of the ceramic particles of this complementary particulate fraction is preferably less than, preferably less than 2 times, less than 5 times the median length $L'_{50}$ of the first particulate fraction. The quality of the stack of the orientable, preferably anisotropic, particles is advantageously improved thereby.

In one embodiment, the fraction complementary to the orientable particles or to the anisotropic particles consists of the second particulate fraction.

The materials constituting the orientable, or even anisotropic, ceramic particles, the ceramic particles of the second particulate fraction, the particles of the fraction complementary to the orientable particles or to the anisotropic particles and the particles of the first particulate fraction may be of materials $M_A$, $M_B$, $M_C$, and $M_D$ respectively, which may be identical or different.

In one embodiment, the material of the ceramic particles of the second particulate fraction has a melting point above the sintering temperature. Preferably, the material $M_A$ and/or the material $M_B$ and/or the material $M_C$ and/or the material $M_D$ comprise(s), or is (are) selected from oxides, nitrides, carbides, carboxynitrides, graphite, graphene and mixtures thereof, preferably selected from group A comprising zirconium oxide or zirconia ($ZrO_2$), partially stabilized zirconium oxide, stabilized zirconium oxide, yttrium oxide ($Y_2O_3$), doped yttrium oxide, preferably yttrium oxide doped with samarium oxide, titanium dioxide ($TiO_2$), the aluminosilicates such as mullite, cordierite ($Al_3Mg_2AlSi_5O_{18}$), aluminium oxide or alumina ($Al_2O_3$), the hydrated aluminas, and in particular boehmite, magnesium oxide (MgO), talc ($Mg_3Si_4O_{10}(OH)_2$), nickel oxide (NiO), the iron oxides (FeO, $Fe_2O_3$, $Fe_3O_4$), cerium oxide, doped cerium oxide, the oxides with perovskite structure, in particular the gallates, compounds comprising lanthanum of the type $LaAlO_3$ or $LaGaO_3$ or $La_{(1-x)}Sr_xMO_3$, with $0 \leq x \leq 1$ and M an element selected from the group comprising chromium, cobalt, magnesium, iron, gadolinium, manganese and mixtures thereof; the oxides with perovskite structure doped with platinum and/or palladium and/or rhodium and/or gold and/or silver, for example $La_{(1-x)}Sr_xM_{(1-y)}M'_yO_3$ with $0 \leq x \leq 1$, $0 \leq y \leq 0.15$, M being an element selected from the group comprising chromium, cobalt, magnesium, iron, gadolinium, manganese and mixtures thereof, M' being an element selected from the group comprising platinum, palladium, rhodium, gold, silver and mixtures thereof, the compounds comprising titanium of the type $La_4Sr_8Ti_{11}Mn_{1-x}Ga_xO_{38}$ with $0 \leq x \leq 1$ and $La_4Sr_8Ti_{12-n}Mn_nO_{38}$ with $0 \leq n \leq 1$, the compounds of the type $BaTiO_3$, $BaZrO_3$, $(1-x)[Pb(Mg_{1/3}Nb_{2/3})O_3]-x[PbTiO_3]$, with x between 0 and 1, $Pb(Mg_{0.25}Nb_{0.75})O_3$, $Ba(Zn_{0.25}Nb_{0.75})O_3$, $Pb(Zn_{0.25}Nb_{0.75})O_3$, $PbTiO_3$, $CaCu_3Ti_4O_{12}$, the compounds with a structure of the bimevox type, for example $Bi_2V_{1-x}Me_xO_z$ with $0 \leq x \leq 1$, z such as to ensure electroneutrality, and Me an element selected from the group comprising magnesium, aluminium, silicon, titanium, cobalt, nickel, copper, zinc, manganese, antimony, tantalum, niobium, chromium, molybdenum, tungsten, uranium and mixtures thereof, the compounds with a structure of the lamox type, for example $La_2Mo_2O_9$, the compounds with the apatite structure, for example $Me'_{10}(XO_4)_6Y'_2$ in which Me' is a metal cation selected from the group comprising $Ca^{2+}$, $Cd^{2+}$, $Sr^{2+}$, $Ba^{2+}$, $Pb^{2+}$, $Na^+$, $K^+$, cations of rare earths, preferably $La^{3+}$ and $Nd^{3+}$, $Al^{3+}$, $U^{4+}$, $Th^{4+}$, ($XO_4$) is an anionic group selected from $PO_4^{3-}$, $SiO_4^{4-}$, $AsO_4^{3-}$, $MnO_4^-$, $SO_4^{2-}$, $CO_3^{2-}$, $HPO_4^{2-}$, $SiO_4^{4-}$, $GeO_4^{4-}$ and mixtures thereof, and Y' is an anion selected from F, Cl$^-$, OH$^-$, Br$^-$, F$^-$, $CO_3^{2-}$, $O^{2-}$ and mixtures thereof, the compounds of type $SrCe_{1-x}M_xO_3$ with $0 \leq x \leq 1$ and M a rare earth, M preferably being ytterbium, the compounds of the type $BaCe_{1-x}M_xO_3$, with $0 \leq x \leq 1$ and M a rare earth, for example the compound $BaCeO_3$, the compounds of the family $La_xSr_{1-x}ScO_3$ with $0 \leq x \leq 1$, for example $La_{0.9}Sr_{0.1}ScO_3$, the zeolites of structure $Na_{x1}Ca_{x2}Mg_{x3}Ba_{x4}K_{x5}Al_{x6}(Si_{x7}O_{x8}),x9H_2O$, x1 to x9 being positive integers or zero fulfilling the following conditions: x6>0, x7>0, x8>0, x9>0 and x1+x2+x3+x4+x5>0, (Li,Na,K)(Nb,Ta,Sb)$O_3$, $KNbO_3$ optionally doped preferably with lithium and/or tantalum and/or barium, $NaNbO_3$ optionally doped preferably with lithium and/or tantalum and/or barium, $(K_{0.5}Na_{0.5})NbO_3$ optionally doped preferably with lithium and/or tantalum and/or barium, haematite, aluminium nitride, boron nitride, preferably hexagonal boron nitride, silicon nitride, titanium nitride, titanium carbide, silicon carbide, tungsten carbide, zirconium carbide, graphite, graphene and mixtures thereof.

Preferably, the zirconium oxide is stabilized, partially and preferably fully, with yttrium oxide and/or with calcium oxide and/or with magnesium oxide and/or with cerium oxide and/or with scandium oxide and/or with samarium oxide and/or with strontium oxide and/or with titanium oxide, preferably with yttrium oxide. Preferably, the cerium oxide is doped with samarium oxide and/or with gadolinium oxide and/or with yttrium oxide and/or with iron oxide, preferably doped with gadolinium oxide.

In one embodiment, the material $M_A$ and/or $M_B$ and/or $M_C$ and/or $M_D$ is not magnetic, and/or the anisotropic ceramic particles, or even the orientable particles, or even the ceramic particles, are not covered, even partially, with a magnetic coating.

Liquid Phase

The amount of liquid phase, or the amount of water, is preferably above 50%, preferably above 60%, preferably above 70%, preferably above 80%, preferably above 90%, in percentage by volume of the slip.

The liquid phase preferably contains more than 50%, preferably more than 60%, preferably more than 70%, preferably more than 80%, preferably more than 90% of water, preferably more than 95% of water, in percentage by volume based on the liquid phase. The liquid phase may consist of water.

In one embodiment, the liquid phase may comprise an alcohol, preferably in an amount above 0.5%, preferably above 1%, preferably above 2%, preferably above 3%, and/or below 10%, or even below 5%, by weight based on the weight of the liquid phase. Preferably said alcohol is selected from the group comprising methanol, ethanol, tert-butanol, and mixtures thereof.

In one embodiment, the liquid phase does not comprise alcohol.

In one embodiment, the liquid phase is 2-methylpropan-2-ol.

Preferably, the liquid phase comprises a cellulose ether, especially when the orientable, or even anisotropic, ceramic particles are particles of boron nitride. Preferably, the amount of cellulose ether is such that the ratio (weight of cellulose ether, in grams)/[(specific surface of the ceramic particles, in m²/g)×(weight of the orientable ceramic particles, in grams) is above 0.0003 g/m², above 0.0004 g/m², preferably above 0.0005 g/m², preferably above 0.0006 g/m² and below 0.004 g/m², below 0.035 g/m², preferably below 0.003 g/m², preferably below 0.002 g/m², or even below 0.0015 g/m². The inventors discovered, unexpectedly, that the presence of a cellulose ether makes it possible to prepare a suspension having very low viscosities, regardless of the shear gradient.

The cellulose ether is preferably a cellulose ether of the alkyl family, preferably a methyl cellulose, or a cellulose ether of the hydroxyalkyl family, preferably a hydroxyethyl cellulose.

The amount of cellulose ether is preferably above 0.1%, or even above 0.3%, or even above 0.4% and/or below 5%, or even below 4%, or even below 2.5%, or even below 2%, or even below 1.5%, or even below 1%, in percentage by weight based on the weight of said ceramic particles.

During mixing, the pH of the slip is preferably between 3 and 12. Degradation of the cellulose ether is advantageously reduced, or even eliminated thereby. The pH may be adjusted by adding acid(s) and/or base(s).

The slip preferably contains at least one binder, preferably temporary. Preferably the content of binder is between 0.5 and 5 wt % based on the amount of ceramic particles. Advantageously, the mechanical strength before sintering is improved thereby. The temporary binders conventionally used in the manufacture of sintered products may be used, for example polyvinyl alcohol (PVA), polyethylene glycols (PEG).

The slip may also contain a dispersant facilitating production of a homogeneous suspension. Preferably, the content of dispersant is between 0.1 and 10 wt %, based on the amount of powder of ceramic particles. The dispersants conventionally used in the manufacture of sintered products by slip casting may be employed, for example the ammonium polymethacrylates such as Darvan C, made by the company Vanderbilt.

The slip may also contain an anti-foaming agent. Preferably the content of anti-foaming agent is between 0.1 and 10 wt % based on the amount of powder of ceramic particles. The anti-foaming agents conventionally used in the manufacture of sintered products by slip casting may be employed, for example CONTRASPUM CONC. marketed by the company Zschimmer and Schwarz.

In one embodiment, the ceramic particles, water, optional binder, optional dispersant, optional anti-foaming agent together represent more than 80%, more than 90%, more than 95%, more than 99%, or even roughly 100% of the weight of the slip.

The slip may also comprise an additive. Preferably the content of additive is between 0.01% and 20 wt % based on the weight of the ceramic particles and/or of the precursors of ceramic particles. The additive may be selected from the compounds conventionally used as antifreezes, in particular from the group consisting of sodium chloride (NaCl), glycerol, the carbohydrates such as sucrose and trehalose. Preferably, when the orientable ceramic particles are particles of boron nitride, the preferred additive is a carbohydrate, preferably sucrose. The additive may also be zirconium acetate.

Preferably the various constituents of the slip are added with stirring.

Mixing of the various constituents of the slip may be carried out by any technique known by a person skilled in the art, for example in a mixer, in a Turbulat mixer, in a drum-type ball mill, preferably of the same kind as the ceramic powder in suspension. The intensity of mixing and/or the mixing time are preferably adjusted so as not to break the orientable particles. For this purpose, the orientable particles may be introduced last in the previously mixed slip.

If a rotating drum grinder is used, the mixing time is preferably more than 0.5 hour and less than 20 hours. Preferably, a rotating drum grinder is used, the orientable particles being added to a slip previously mixed for 24 hours, the mixing time starting from adding the orientable particles to the slip being more than 30 minutes and preferably less than 2 hours.

Mixing may be facilitated by treating the slip with ultrasound, with energy preferably above 70 Wh/kg of slip, preferably above 100 Wh/kg, preferably above 150 Wh/kg, while preventing the slip temperature exceeding 30° C. A cooling system, for example water circulation, may be provided to limit the temperature rise.

The process may comprise an optional step a'), prior to step a), of depositing particles and/or particle precursors of the second particulate fraction on the surface of the particles of the first particulate fraction. The deposit produces consolidation on said surface, which is maintained at least until formation of the macropores. Said deposition may be carried out by techniques such as heterocoagulation or by application of a particle precursor, for example an alkoxide, on the surface of the particles of the first particulate fraction. The deposition method described in «*Alumina nanocomposites from powder-alkoxide mixtures*», Schehl et Al., Acta Materialia 50 (2002), pages 1125 to 1139, hereby incorporated by reference, may be deployed. A step a") may be carried out after step a') and before step a) in order to transform the particle precursors of the second particulate fraction into particles. The step a") may for example be a heat treatment, for example as described in the article «*Alumina nanocomposites from powder-alkoxide mixtures*», Schehl et Al., Acta Materialia 50 (2002), pages 1125 to 1139.

In step b), the slip is preferably poured into a mould suitable for the oriented freezing in the next step.

Preferably, a process according to the invention also comprises an operation of removing the air bubbles, preferably before pouring the slip into the mould. The air bubbles are preferably removed by degassing under vacuum or using ultrasound.

In step c), the slip is cooled so as to solidify the liquid phase and form crystals of solidified liquid phase. So that the directions of growth of the various crystals are roughly parallel, the slip is solidified progressively by creating and then displacing, in the slip, a zone with rapid thermal transition between an upstream region in which the liquid phase has solidified and a downstream region in which the liquid phase is still liquid. Its passage through the slip leads to solidification of the liquid phase. That is why this zone is conventionally called the "solidification front".

The creation and movement of a solidification front, required for oriented freezing of the slip, are techniques commonly used in the field of "ice templating". This technology is a particular embodiment of the general process of "freezing/removal of frozen crystals", called "freeze casting". Preferably, a liquid, in particular liquid nitrogen, is used for creating the solidification front.

Preferably, the velocity Vp of the solidification front is adjusted so that $e \leq 100 \cdot W1_{50}$, preferably $e < 50 \cdot W1_{50}$, preferably $e < 30 \cdot W1_{50}$, preferably $e < 25 \cdot W1_{50}$.

In one embodiment, the velocity Vp of the solidification front is adjusted so that $W1_{50} \leq e \leq 16.W1_{50}$, preferably $W1_{50} \leq e \leq 12.W1_{50}$, preferably $W1_{50} \leq e \leq 4.W1_{50}$. Preferably in said embodiment,

- more than 90%, more than 95%, or even roughly 100% by volume of the orientable ceramic particles, preferably anisotropic, have a length L between 7 and 16 μm, a thickness W1 between 0.5 and 1 μm, and an elongation factor L/W1 between 10 and 20,
- the ceramic particles represent between 8 and 11 vol % of the volume of the slip,
- the orientable ceramic particles, preferably anisotropic, represent more than 90 vol % of the ceramic particles, and
- the velocity of the solidification front is between 15 μm/s and 25 μm/s.

In one embodiment, $W1_{50} \leq e \leq 16.W1_{50}$, preferably $3.W1_{50} \leq e \leq 15.W1_{50}$, preferably $5.W1_{50} \leq e \leq 15.W1_{50}$, preferably $10.W1_{50} \leq e \leq 15.W1_{50}$. Preferably in said embodiment,

- more than 90%, more than 95%, or even roughly 100% by volume of the orientable ceramic particles, preferably anisotropic, have a length L between 7 and 16 μm, a thickness W1 between 0.5 and 1 μm, and an elongation factor L/W1 between 10 and 20,
- the ceramic particles represent between 14 and 19 vol % of the volume of the slip,
- the orientable ceramic particles, preferably anisotropic, represent more than 90 vol % of the ceramic particles, and
- the velocity of the solidification front is between 10 μm/s and 20 μm/s.

In one embodiment, $17.W1_{50} \leq e \leq 100.W1_{50}$, preferably $20.W1_{50} \leq e \leq 50.W1_{50}$. Preferably in said embodiment,

- more than 90%, more than 95%, or even roughly 100% by volume of the orientable ceramic particles, preferably anisotropic, have a length L between 5 and 8 μm, a thickness W1 between 0.2 μm and 1 μm, and an elongation factor L/W1 between 10 and 20,
- the ceramic particles represent between 14 and 19 vol % of the volume of the slip,
- the orientable ceramic particles, preferably anisotropic, represent more than 90 vol % of the ceramic particles, and
- the velocity of the solidification front is between 7 μm/s and 15 μm/s.

With passage of the solidification front, the new crystals of solidified liquid phase are oriented, and then grow roughly in the direction of solidification imposed by the thermal gradient. The direction of solidification corresponds approximately to the direction of advance of the solidification front.

The size of the crystals of solidified liquid phase mainly depends on the velocity of displacement of the solidification front and on the thermal gradient associated with this solidification front. The higher the velocity of the solidification front, the smaller the crystals of solidified liquid phase.

The size of the crystals of solidified liquid phase may also be modified by the composition of the slip, and in particular by the optional presence of a binder and/or by the size of the ceramic particles.

A person skilled in the art thus knows how to adapt the process to obtain a desired wall thickness. In particular, he knows that to reduce the thickness e, it is sufficient to increase the temperature gradient on passage of the solidification front and/or increase the cooling rate and/or reduce the length of the particles in suspension and/or reduce the amount of particles in suspension in the slip, and vice versa.

Oriented freezing leads to macroscopic truncated tubular pores (except in particular conditions described in "*Solidification of colloidal suspensions*", Peppin et al., J. Fluid Mech. (2006), Vol. 554, pp. 147-166), in contrast to pores formed by coextrusion.

When a product according to the invention is intended to be infiltrated with an impregnating material, the truncated shape of the tubular pores improves impregnation.

The shape of the solidification front is not limiting. In particular, the solidification front may be flat at the scale of the block manufactured.

The direction of displacement of the solidification front is preferably straight, leading to crystals that are approximately rectilinear. Advantageously, it is thus possible to create long crystals of solidified liquid phase, roughly parallel to one another. The solidification of the liquid phase leads to concentration of the ceramic particles in the spaces between the crystals of solidified liquid phase. During this movement, the particles of the second particulate fraction become trapped between the coarse particles, which leads to an increase in apparent density, notably after sintering.

Several solidification fronts, having identical or different thermal gradients and/or shapes, may be created and displaced, successively or simultaneously, in identical or different directions, at identical or different velocities. In particular, when the slip has been poured into a mould, several solidification fronts may start out from different faces of the mould, for example starting from each face of the mould. The crystals of solidified liquid phase are then oriented from the outside towards the centre of the block of solidified slip.

Preferably, the direction of displacement of a solidification front is roughly perpendicular to the surface from where it started.

In one embodiment, the conditions of oriented freezing are adapted to form crystals of solidified liquid phase having, in a median transverse plane, a width more than 5 times, preferably more than 10 times, or even more than 20 times greater than the thickness of the crystal of solidified liquid phase.

The crystals of solidified liquid phase then have a lamellar general shape of small thickness, when observed in a median transverse plane.

In this embodiment, preferably more than 50%, preferably more than 70%, preferably more than 80%, preferably more than 90%, preferably more than 95% by number, preferably roughly all the crystals of solidified liquid phase are roughly parallel to one another.

During the step of oriented freezing, as it moves, the solidification front pushes back the particles of the slip in the walls located between the crystal lamellae of solidified liquid phase, thus forming, depending on the width of said lamellae, walls that are preferably roughly flat and parallel to one another. The shape of the crystals of solidified liquid phase depends in addition on the conditions of seeding and growth of the first crystals of solidified liquid phase initially formed in step c).

A person skilled in the art knows how to determine these conditions of seeding. For example, he can use a surface, starting from which seeding takes place, comprising a pattern of spaced, parallel linear reliefs, as described in the article "*Architectural Control of Freeze Cast Ceramics Through Additives and Templating*", E. Munch, E. Saiz, A. P. Tomsia, S. Deville, J. Am. Ceram. Soc., Vol. 92, No. 7, pages 1534 to 1539 (2007), incorporated by reference. The crystals of solidified liquid phase then grow epitaxially in a direction that depends on the patterns of the linear reliefs. Moreover, a person skilled in the art knows how to determine the desired thickness of the crystals of solidified liquid phase, notably by changing the spacing between the patterns of linear reliefs. A person skilled in the art may thus partly obtain a desired shape of pores that remain after removal of the crystals of solidified liquid phase, and notably a flattened shape in a median cross-section.

As a variant, to obtain crystals of solidified liquid phase having a lamellar shape, able after step e) to form flattened pores, a process of oriented freezing such as the seeding of the crystals of solidified liquid phase starting linearly may be used. Such a process may for example be a "freeze-tape casting" process, as described in the article "*Fabrication of Functionally Graded and Aligned Porosity in Thin Ceramic Substrates With the Novel Freeze-Tape Casting Process*", S. W. Sofie, J. Am. Ceram. Soc, Vol. 90, No. 7, pages 2024-2031, (2007), incorporated by reference, may be employed.

In an embodiment, the oriented freezing does not comprise the sequence of an operation of seeding of crystals of linearly solidified liquid phase and an operation of epitaxial growth of said crystals. Such a freezing may, for example, be a freezing as described in «*Control of lamellae spacing during freeze casting of ceramics using double-side cooling as a novel processing route*», Waschlies et Al., J. Am. Ceram. Soc., 92[S1] S79-S84 (2009), hereby incorporated by reference, it being possible for said freezing to be in particular the «single-side» mode of freezing.

The shape of the pore cross-section mainly depends on the velocity of the solidification front.

The shape of the cross-section of a pore may also be modified by the presence of additives in the slip, as described above, as is also described in the article "*Architectural Control of Freeze Cast Ceramics Through Additives and Templating*", E. Munch, E. Saiz, A. P. Tomsia, S. Deville, J. Am. Ceram. Soc., Vol. 92, No. 7, pages 1534 to 1539 (2007), incorporated by reference.

Preferably, the whole of the slip is solidified during step c).

In step d), the block of solidified slip is removed from the mould. Preferably, the temperature conditions are adjusted to avoid any melting of the crystals of solidified liquid phase.

In step e), the block of solidified slip is placed in conditions of pressure and temperature leading to removal of the crystals of solidified liquid phase.

Preferably, removal results from sublimation of the crystals of solidified liquid phase. Advantageously, sublimation takes place almost without any displacement of the particles disposed between these crystals. For example, the crystals of solidified liquid phase may be sublimed by heating them at very low pressure, typically at a pressure below 0.5 mbar.

It is also possible to melt the crystals of solidified liquid phase, and allow the resultant liquid to flow away.

The disappearance of a crystal of solidified liquid phase leaves room for a macroscopic pore delimited by a wall principally formed by the particles initially in suspension in the slip, the shape of this pore roughly corresponding to the shape of the crystal removed. Thus, the creation of elongated crystals of solidified liquid phase, roughly parallel to one another, is what leads to the creation of tubular pores, also parallel to one another.

A macroporous preform is thus obtained.

The presence of a binder makes it possible to increase the mechanical strength of the macroporous preform.

Step e) is continued preferably until all the crystals of solidified liquid phase have been removed.

In the embodiment described above, where the block formed in step c) comprises lamellar crystals of solidified liquid phase, the manufacturing process may comprise a step e'), preferably following step e), consisting of compressing said block in a direction roughly parallel to the direction of the thickness of the lamellar crystals of solidified liquid phase, so as to obtain a product having a relative density above 85%, preferably above 90%, or even above 95%.

The intensity of compression is preferably suitable for crushing the macropores until they more or less disappear.

Such a step advantageously makes it possible to manufacture a dense product comprising oriented grains, optionally with oriented function. This dense product, optionally sintered respectively, has mechanical properties (breaking stress, toughness), and if applicable an intensity of the oriented function per unit volume of said product, that are increased relative to those of the block starting from which it was formed by compression, or relative to a block obtained in step c) and then sintered, respectively.

Figure 30:
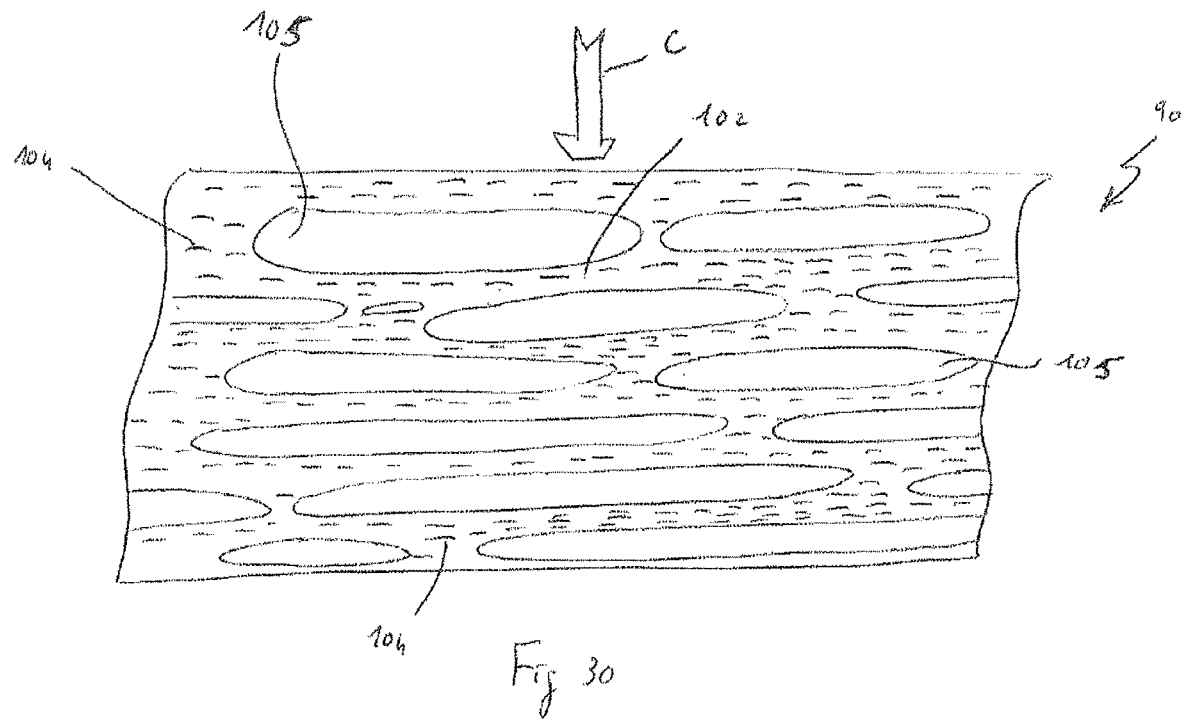
FIGS. 30 and 31 show respectively a product comprising flattened pores after step e), and a dense product obtained by compression in step e') of the product shown in FIG. 30.
Figure 31:
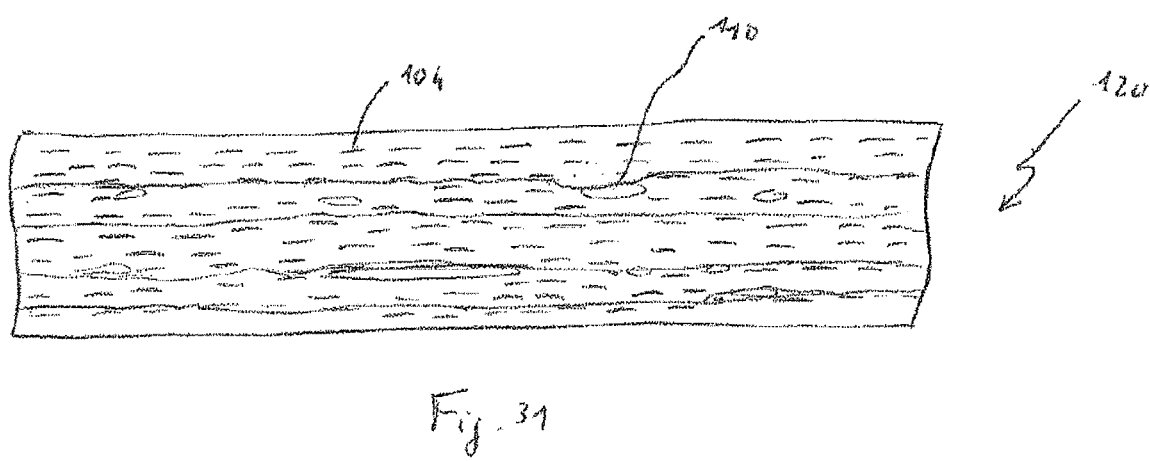

As illustrated in FIGS. 30 and 31 showing a product 90 observed in a median cross-section, during the compression step C, the walls 102 consisting of orientable particles 104, located between the flattened pores 105 (macropores) resulting from the removal of the lamellar crystals of solidified liquid phase, are displaced relative to one another and get closer together until they come in contact. This compression step then results in partial, or even total, removal of flattened pores, and then only a residual porosity 110 remains.

In other words, the dense product obtained by the compression step consists of a stack of walls. The thickness of the dense product 120 is preferably more than 2 times, preferably more than 5 times, preferably more than 10 times, preferably more than 50 times, preferably more than 100 times, preferably more than 500 times, or even more than 1000 times, greater than the average thickness in a median transverse plane of a wall separating two pores.

Preferably, the thickness of the dense product is above 50 μm, preferably above 100 μm, preferably above 500 μm, or even above 1 mm, or even above 5 mm, or even above 1 cm, or even above 5 cm.

In step c) or in step d) or in step e), a portion of the block comprising more than 50%, preferably more than 60%, preferably more than 70%, preferably more than 80%, preferably more than 90%, preferably more than 95%, preferably roughly 100% of lamellar crystals of solidified liquid phase, preferably roughly parallel to one another, may be selected and then extracted, for example by cutting out or stamping. It is then possible to perform the operation of compression described above on said portion of block, in a direction roughly parallel to the direction of the thickness of the lamellar crystals of solidified liquid phase.

In step f), the macroporous preform is arranged in such a way that it can be heated. Any binder present is then removed. The plateau time, the temperature and the atmosphere for the binder removal treatment are determined in relation to the nature of the binder or binders used.

Preferably, a process comprises a sintering step g), leading to an increase in mechanical strength. The resultant porous sintered product advantageously has good mechanical strength, even after removing the binder. The plateau time, the temperature and the atmosphere for sintering are determined as a function of the nature and characteristics of the product to be manufactured. These parameters are well known by a person skilled in the art.

In a preferred embodiment, binder removal and sintering are carried out during the same thermal treatment, steps f) and g) being combined.

In a preferred embodiment, step e') of compression of the block may be carried out before and/or together with the step of binder removal f) and/or the sintering step g). Preferably, the step of binder removal f) and/or the sintering step g) are then carried out by the method of sintering under pressure ("Hot Pressing", HP) or by the SPS ("Spark Plasma Sintering") method, which are familiar to a person skilled in the art. Sintering then allows rigid bonding of the walls that were brought into contact by the compression step.

Sintering may also be carried out following placement of the macroporous preform in its operating position, for example if a product according to the invention is used as catalyst support in a reactor operating at high temperature.

Sintering may transform the morphology of the fine grains (corresponding to the particles of the second particulate fraction) disposed between the orientable, in particular anisotropic grains. Under the effect of this transformation, the fine grains may in particular coalesce with the orientable grains, for example so as to form larger orientable grains, improve the stacking of the grains and reduce the interstices between said grains. This notably results in remarkable apparent density and mechanical properties.

Figure 8A:
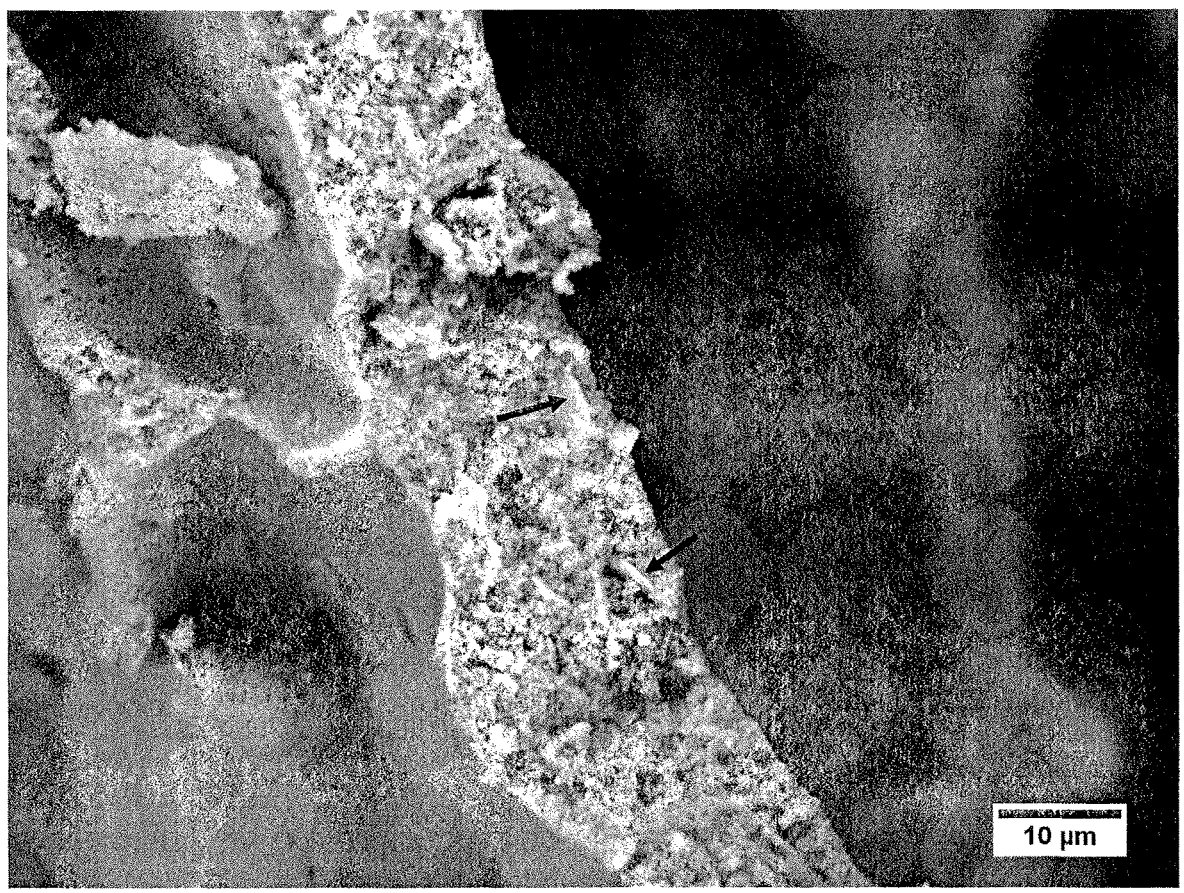
Figure 8B:
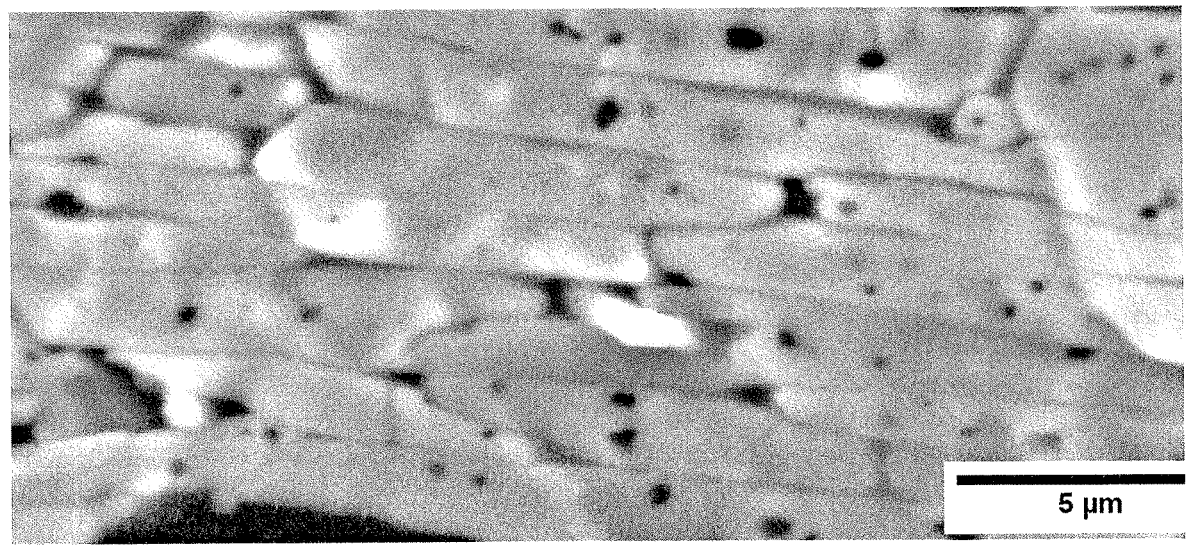
Figure 9:
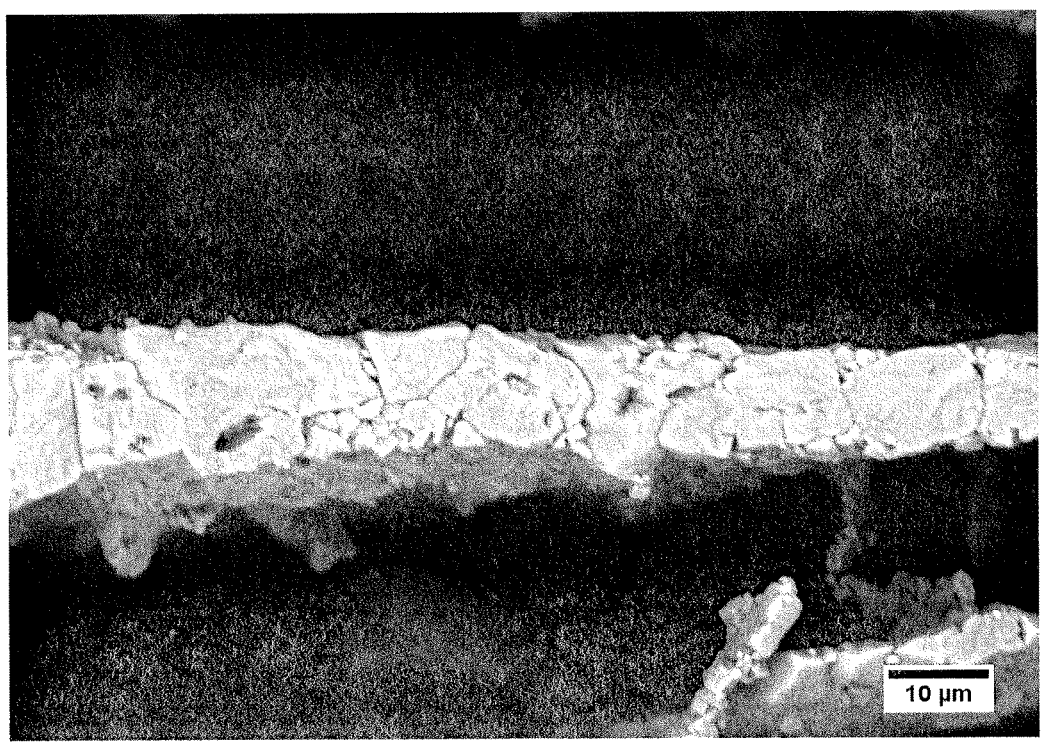
Figure 10:
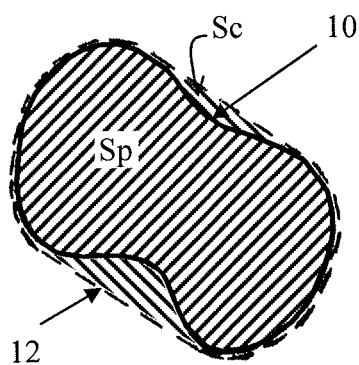
FIGS. 10 and 11 illustrate the method for evaluating the convexity index.
Figure 11:
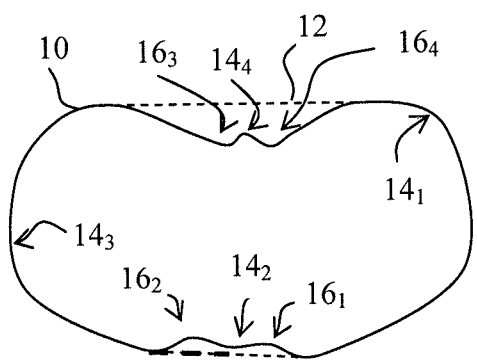
Figure 12:
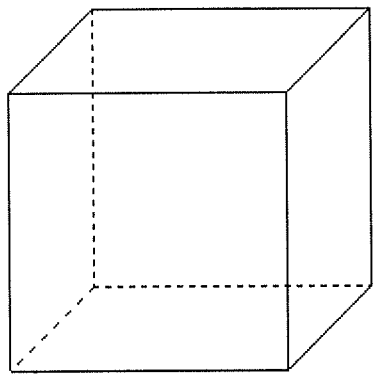
FIGS. 12 to 28 show a cube, a saw-tooth fibre, prismatic chains, a pseudo-cubo-octahedron, square cylinders, tetrapods, pointed tetrapods, an octapod, a truncated cube, a cubo-octahedron, a truncated octahedron, an octahedron, stars, a pillar, an icosahedron, hexagonal bipyramids, microtubes, respectively.
Figure 13:
Figure 14:
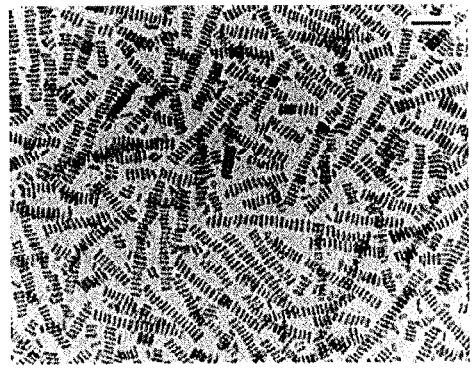
Figure 15:
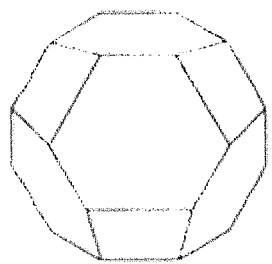
Figure 16:
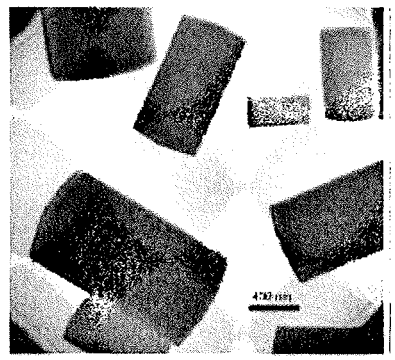
Figure 17:
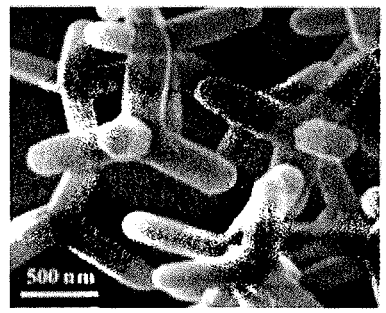
Figure 18:
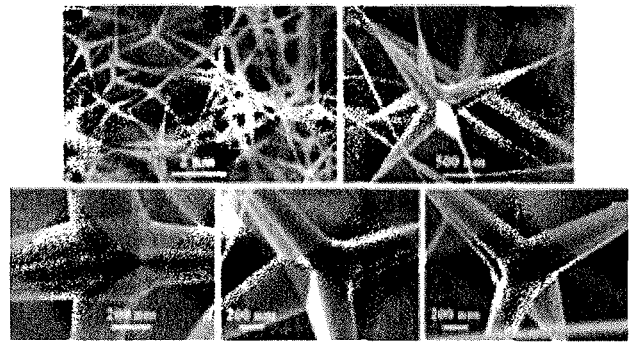
Figure 19:
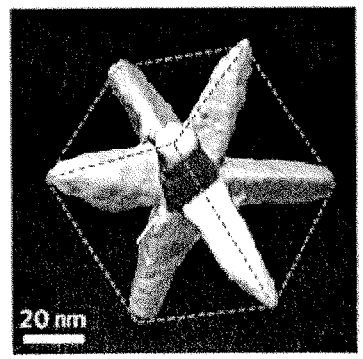
Figure 20:
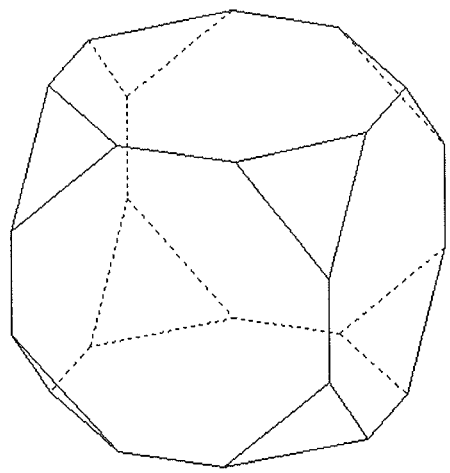
Figure 21:
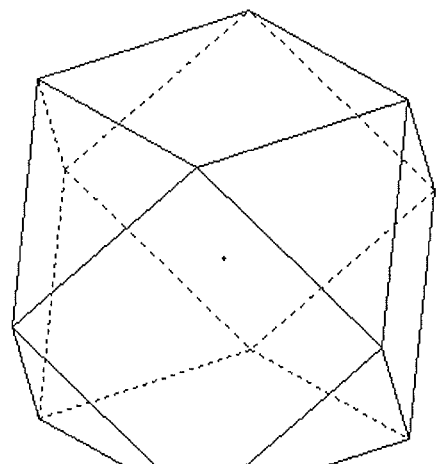
Figure 22:
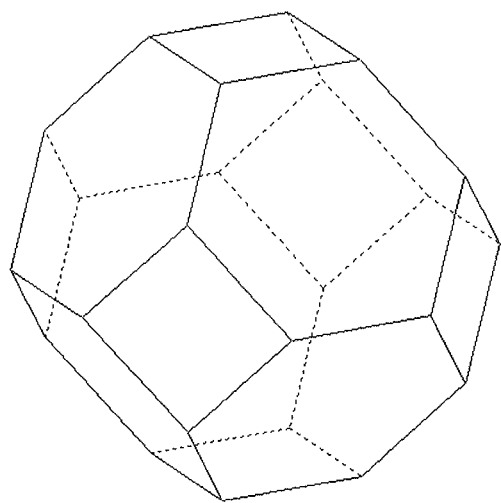
Figure 23:
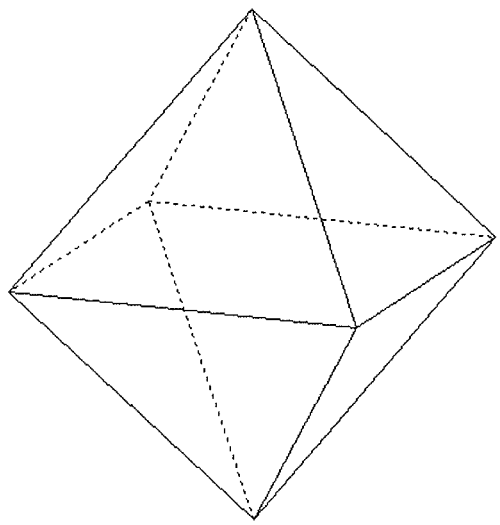
Figure 24:
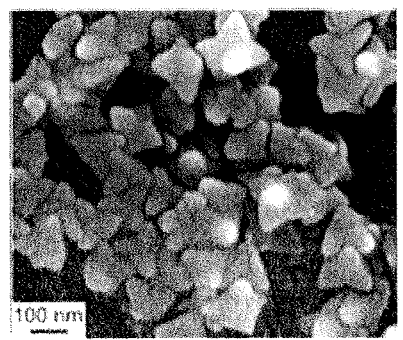
Figure 25:
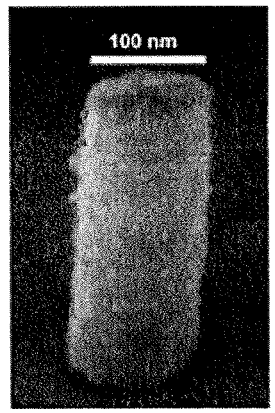
Figure 26:
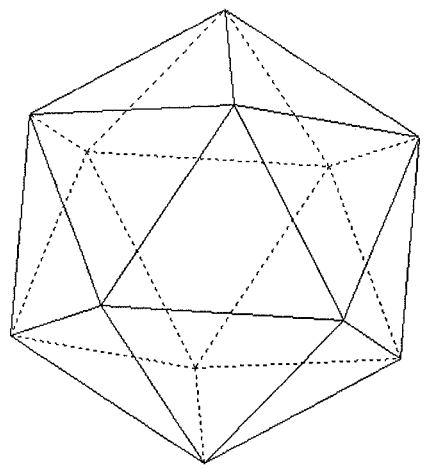
Figure 27:
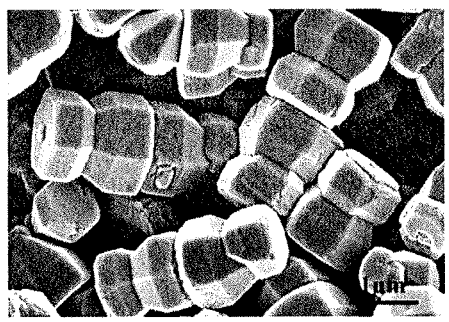
Figure 28:
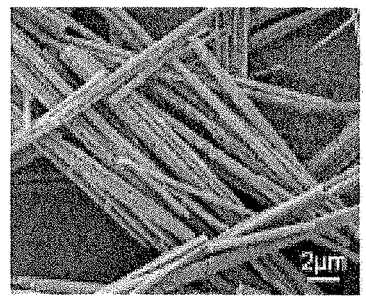

FIG. 8b illustrates the structure of the wall resulting from the presence of the particles of the second particulate fraction. It shows that after sintering, the particles of the second particulate fraction have coalesced with the platelets initially present to form platelets, sometimes with shapes complementary to that of the initial platelets. The residual microporosity (black spots) is advantageously greatly reduced thereby.

Figure 6:
Figure 7:

This wall structure contrasts with that in FIG. 6, for which the slip contained practically no particles of the second particulate fraction.

In step h), the porous product may be machined by any technique known by a person skilled in the art. Preferably, the porous product is machined in order to remove the transition zone corresponding to the start of the solidification front and the establishment of stable solidification conditions, the solidification conditions being called "stable" when the growth rate of the crystals of solidified liquid phase is roughly constant.

Impregnation may be carried out by any technique known by a person skilled in the art. Preferably the impregnation is an impregnation using a liquid medium.

The impregnating material may be selected from ceramics, metals, organic materials and mixtures thereof, notably selected from:
the materials of group A above,
a catalytic coating comprising or consisting of a catalyst material selected from
metals, preferably iron (Fe), cobalt (Co), nickel (Ni), molybdenum (Mo), copper (Cu), ruthenium (Ru), rhodium (Rh), platinum (Pt), palladium (Pd), gold (Au), silver (Ag), iridium (Ir), osmium (Os), rhenium (Re), and mixtures thereof;
oxides, preferably the oxides of scandium (Sc), of titanium (Ti), of vanadium (V), of chromium (Cr), of cobalt (Co), of copper (Cu), of palladium (Pd), of molybdenum (Mo), of iron (Fe), of nickel (Ni), of tungsten (W), of rhenium (Re), oxides with perovskite structure, oxides with fluorite structure, zeolites, oxides of lanthanides, preferably $CeO_2$, and mixtures thereof;
the carbides, the oxycarbides of formulae $(carbide)_{1-x}O_x$, with $0<x<1$;
and mixtures thereof;
aluminium, copper, alloys of aluminium and of copper, polymers, and notably resins
and mixtures thereof.

Preferably, the impregnating material is different from the material of the product according to the invention into which it is infiltrated.

Impregnation may lead to simple coating on the surface of the truncated tubular pores or to partial or complete filling of said pores.

The particular shape of the macroscopic tubular pores means they can be infiltrated very efficiently by an impregnating material, in particular to constitute a composite material. This efficiency is remarkable when the ensemble of particles of the impregnating material, generally in suspension, have a median length less than 0.1 times the average equivalent diameter of the wide openings of the truncated tubular pores, and preferably less than 0.1 times the average equivalent diameter of the narrow openings of said pores. The median length of the ensemble of particles of the impregnating material may typically be between 0.01 μm and 4 μm. The truncated tubular pores are preferably open at both ends, further facilitating penetration of the impregnating material.

Preferably, when a product according to the invention is impregnated with an impregnating material, penetration of the impregnating material takes place via the wide openings of the pores.

A process according to the invention makes it possible to manufacture a product in a ceramic material, which is therefore particularly able to withstand high temperatures and thermal shocks.

Product According to the Invention

A product according to the invention may be manufactured by a process according to the invention.

The materials constituting the orientable, or even anisotropic ceramic grains, the fine ceramic grains (i.e. corresponding to the particles of the second particulate fraction) and the grains of the fraction complementary to the orientable grains or to the anisotropic grains may be of materials $M_A$, $M_B$ and $M_C$, respectively, which may be identical or different.

In one embodiment, the material of the fine ceramic grains has a melting point above the sintering temperature.

Preferably, material $M_A$ and/or material $M_B$ and/or material $M_C$ comprise(s), or is (are) selected from oxides, nitrides, carbides, carboxynitrides and mixtures thereof. They may in particular be selected from group A.

In one embodiment, the product comprises less than 10 vol % of fine grains, or even less than 5%, or even less than 3%, or even less than 1%, or even practically no fine grains, the particles of the second particulate fraction having been transformed into coarser grains during sintering.

The shape and the dimensions of the ceramic grains, in particular of the orientable, or even anisotropic ceramic grains, may correspond to that of the ceramic particles, in particular orientable, or even anisotropic ceramic particles of the slip. The amounts of ceramic grains and of orientable, or even anisotropic ceramic grains, by volume based on the grains making up a wall, may correspond to the amounts of ceramic particles and of orientable, or even anisotropic ceramic particles respectively, by volume based on the volume of the particles of the slip and by volume based on the volume of the ceramic particles of the slip, respectively.

Preferably, the fraction of the ceramic grains that are not anisotropic, or even that are not orientable, has a median length less than ten times the median length of the anisotropic, or even orientable ceramic grains respectively, especially if the ensemble of ceramic grains in said walls comprises less than 80%, in percentage by volume, of anisotropic or orientable ceramic grains, respectively.

In an embodiment, the product comprises a vitreous phase. Preferably, said vitreous phase contains $SiO_2$ and/or $B_2O_3$. The $SiO_2+B_2O_3$ content is preferably greater than 10%, greater than 20%, greater than 30%, greater than 40%, greater than 50%, greater than 60%, greater than 70%, greater than 80% by mass. Said vitreous phase also contains CaO and/or $Na_2O$ and/or $TiO_2$ and/or $K_2O$ and/or $Al_2O_3$. In an embodiment, said vitreous phase contains $SiO_2$, and CaO and $Al_2O_3$.

Truncated Tubular Pores

Preferably, said truncated tubular pores are roughly adjacent to one another so that the transverse planes defining their respective median cross-sections roughly coincide with the average median transverse plane. The average equivalent diameter of the median cross-sections for the ensemble of said truncated tubular pores may then advantageously easily be determined by analysis of an image of a section of the product along this average median transverse plane.

The average equivalent diameter of the median cross-sections of the truncated tubular pores is preferably above 0.5 µm, preferably above 1 µm, or even above 2 µm, or even above 5 µm and/or preferably below 400 µm, preferably below 300 µm, preferably below 270 µm, preferably below 200 µm, or even below 150 µm, or even below 100 µm, or even below 50 µm, or even below 15 µm, or even below 10 µm.

In a preferred embodiment, in the average median transverse plane, at least 50% by number of the truncated tubular pores (considering the ensemble of truncated tubular pores visible in the average median transverse cutting plane) have a convexity index Ic greater than 87%, the convexity index of a pore being equal to the ratio Sp/Sc of the surface areas Sp and Sc delimited by the perimeter and by the convex envelope of said pore, respectively. In other words, these truncated tubular pores are approximately smooth.

The shape of the truncated tubular pores is preferably such that, in the average median transverse cutting plane:
- at least 60%, preferably at least 70%, by number of the pores have a convexity index Ic and/or a solidity index Is greater than 87%, and/or
- at least 40%, preferably at least 44%, preferably at least 54%, by number of the pores have a convexity index Ic and/or a solidity index Is greater than 88%, and/or
- at least 30%, preferably at least 36%, preferably at least 40%, preferably at least 44%, preferably at least 50%, by number of the pores have a convexity index Ic and/or a solidity index Is greater than 89%, and/or
- at least 24%, preferably at least 30%, preferably at least 36%, preferably at least 40%, preferably at least 44%, preferably at least 50%, by number of the pores have a convexity index Ic and/or a solidity index Is greater than 90%, and/or
- at least 20%, preferably at least 24%, preferably at least 30%, preferably at least 35%, preferably at least 40%, preferably at least 45%, by number of the pores have a convexity index Ic and/or a solidity index Is greater than 91%, and/or
- at least 16%, preferably at least 20%, preferably at least 24%, preferably at least 30%, preferably at least 40%, by number of the pores have a convexity index Ic and/or a solidity index Is greater than 92%, and/or
- at least 4%, preferably at least 8%, preferably at least 10%, preferably at least 20%, by number of the pores have a convexity index Ic and/or a solidity index Is greater than 93%.

The cross-section of the truncated tubular pores may or may not be circular. In particular, it may be polygonal, and notably convex hexagonal.

In one embodiment, the cross-section of a truncated tubular pore is flattened. Such a flattened pore may be obtained by removing a crystal of solidified liquid phase of lamellar shape formed in step c) of the process according to the invention. Preferably, more than 50%, or even more than 70%, or even more than 90%, or even more than 95%, or even more than 99%, or even roughly 100% by number of the truncated tubular pores are flattened.

The geometry of the cross-section of the truncated tubular pores may be roughly constant, regardless of the cross-section considered. For example, a pore may have a cross-section of convex hexagonal general shape, regardless of the transverse cutting plane considered, the area of this section being variable.

Preferably, at least 70%, preferably at least 80%, preferably at least 90% by number of the pores are truncated tubular pores opening at their two ends with large and narrow openings, respectively. These pores are called "through-pores". It is thus easier to impregnate them, notably with a catalyst. When they are used as catalyst support, the catalysis reactions are also improved thereby.

More preferably, the ratio of the average equivalent diameter (averaged for the ensemble of said truncated tubular through-pores) of the narrow openings to the average equivalent diameter (averaged for the ensemble of said truncated tubular through-pores) of the wide openings is below 0.99, preferably below 0.95, or even below 0.90, or even below 0.85, or even below 0.80, or even below 0.75.

Walls

Preferably more than 40%, more than 70%, more than 90%, or even roughly 100% of the volume of walls of a product according to the invention has a roughly identical structure, in particular having one or more of the characteristics described below.

Preferably, a wall between said truncated tubular pores comprises more than 10%, preferably more than 20%, preferably more than 30%, preferably more than 50%, preferably more than 70%, preferably more than 80%, preferably more than 90% of orientable, preferably anisotropic ceramic grains. In one embodiment, the wall is constituted almost entirely of orientable, or even anisotropic ceramic grains.

In one embodiment, the orientable ceramic grains, or even the anisotropic ceramic grains, or even the ceramic grains, are not covered, even partially, with a magnetic coating.

Preferably, more than 50%, or even more than 60%, or even more than 70%, or even more than 80%, or even more than 90%, or even more than 95%, or even roughly 100% of the weight of the walls consists of grains, preferably ceramic.

Arrangement of the Ceramic Grains

The orientable ceramic grains are preferably arranged in an ordered manner. Preferably they have one or more preferential orientations, i.e. their orientation is not random. In particular, they may be stacked in the form of layers, preferably roughly parallel to the outside surface of the wall considered, in the proximity of which they extend.

In one embodiment, the concentration of orientable ceramic grains arranged in an ordered manner is higher at the periphery of said walls (i.e. in the proximity of the outside surfaces of the walls in contact with the internal volumes of the truncated tubular pores) than at the centre of said walls (in the proximity of their median planes).

These characteristics may be demonstrated by an image analysis of a cross-section of the wall considered, said image having at least 10 grain boundaries, for example using the Fiji software and the criterion "directionality". The orientation of the ceramic grains according to the invention leads to a peak of higher intensity on the histogram produced by the software (giving the quantity of grain boundaries as a function of the direction (in degrees)). This peak may be approximated by a Gaussian, the "dispersion" being equal to twice the standard deviation of this Gaussian.

Preferably, according to the invention, the dispersion (value also called "dispersion" in the software) is below 30°, preferably below 20°, preferably below 15°.

The histogram produced by the software may comprise several peaks.

Preferably, the area covered by the grain boundaries corresponding to the peak of higher intensity, as a percentage of the area analysed by the software (the value called "Amount" in the software) is above 2%, preferably above 5%, or even above 10%, or even above 20%, or even above 40%, or even above 50%, or even above 60%, or even above 70%, or even above 80%.

In one embodiment, the wall considered comprises a peripheral stratum, i.e. defining, at least partly, the outside surface of the wall, this stratum consisting of a layer of orientable, preferably anisotropic, ceramic grains or by a stack of at least 2 layers of orientable, preferably anisotropic, ceramic grains, preferably 2 to 20, or even from 2 to 10, or even from 2 to 8, or even from 2 to 7, layers of orientable, preferably anisotropic ceramic grains, a "layer of grains" consisting of a plurality of adjacent grains that are not superposed.

In one embodiment, the wall considered comprises two peripheral strata each defining, at least partly, an outside surface of the wall, these strata each consisting of a layer of orientable, preferably anisotropic, ceramic grains or by a stack of at least 2 layers of orientable, preferably anisotropic, ceramic grains, preferably from 2 to 20, or even from 2 to 10, or even from 2 to 8, or even from 2 to 7, layers of orientable ceramic grains, preferably anisotropic.

In one embodiment, the wall considered comprises a central stratum, extending between said two peripheral strata, and consisting of an ensemble of grains whose arrangement is not ordered.

In one embodiment, the ceramic grains are grains of boron nitride and the wall considered comprises a peripheral stratum, i.e. defining, at least partly, the outside surface of the wall, this stratum consisting of a layer of orientable, preferably anisotropic ceramic grains, or by a stack from 2 to 10, preferably from 2 to 8, preferably from 2 to 7, layers of orientable, preferably anisotropic grains of boron nitride.

The thickness of the central stratum may represent less than 30%, less than 10%, less than 5% of the thickness of the wall. The wall may also not comprise a central stratum.

Figure 3:
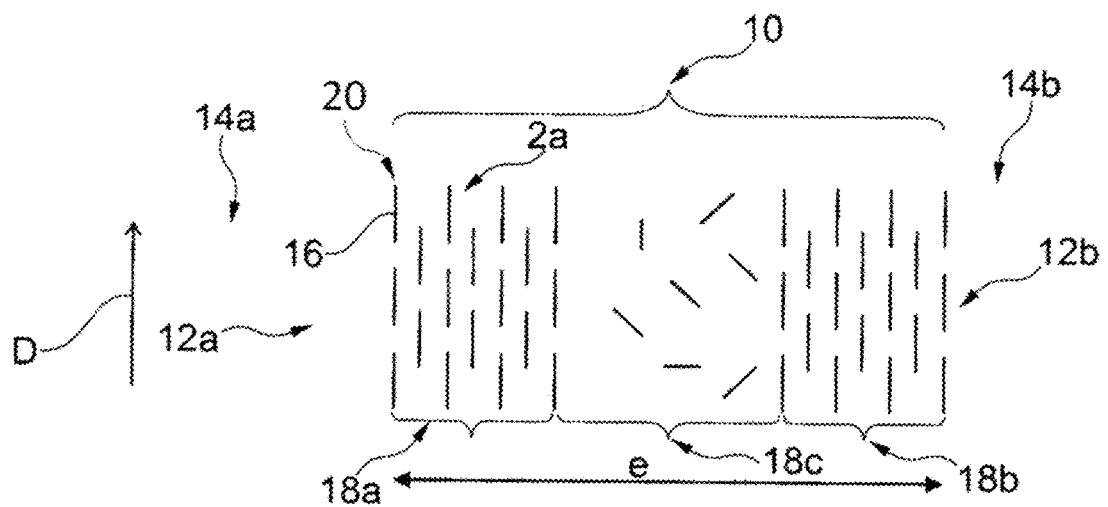
FIG. 3 shows schematically a cross-section of a wall of a truncated tubular pore of a product according to the invention.
Figure 4:
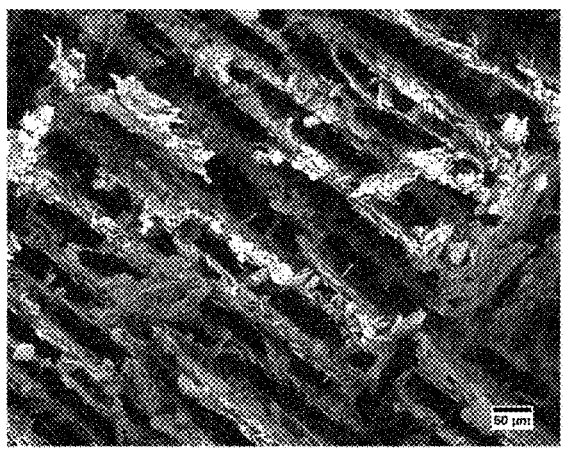
FIGS. 4, 5, 6, 7, 8a, 8b, 9 show images taken with a scanning electron microscope (SEM) of the products of examples 1, 2, 1, 2, 4 before sintering, 4 after sintering, and 8, respectively.
Figure 5:
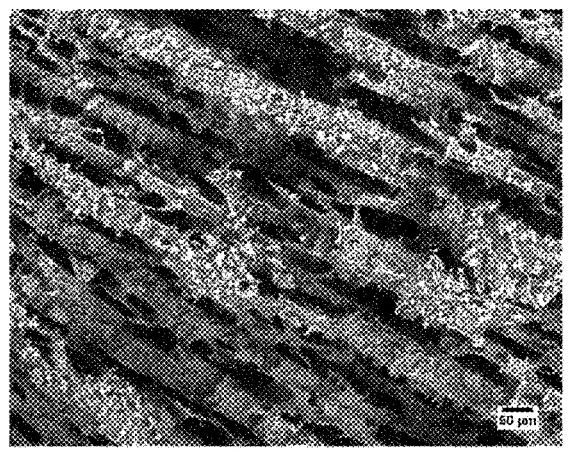

FIG. 3 shows schematically a cross-section of a wall 10 illustrating such a structure. The wall 10, of thickness "e", comprises two outside surfaces 12a and 12b defining the internal volumes of two truncated tubular pores 14a and 14b, respectively.

The grains 16 constituting the wall 10 are platelets which form two peripheral strata 18a and 18b, defining the two outside surfaces 12a and 12b, respectively, and a central stratum 18c.

Each of the two peripheral strata 18a and 18b consists of a plurality of layers 20 of roughly parallel grains, in this case seven layers. In these layers, the grains are arranged flat. The plane of the layers is roughly parallel to the direction of displacement of the solidification front D.

In the central stratum 18c, the particles do not have a preferential orientation.

Employing a process according to the invention, it is possible to modify the thickness e, and therefore modify the microstructure of the wall, by changing the velocity of the solidification front Vp. Especially when the particles are platelets, for example of the type used for the examples, the inventors found that the amount of platelets that may take a preferred orientation under the effect of passage of the solidification front is limited. In particular, the thickness of each peripheral stratum does not exceed about 8 layers of platelets of boron nitride. Thus, if the thickness e is less than the thickness of 16 platelets, practically all the platelets become oriented in planes roughly parallel to the direction of displacement of the solidification front and become stacked in the form of layers. If the thickness e is greater than the thickness of 16 platelets, a central stratum appears, in which the platelets are no longer oriented. Increasing or reducing the wall thickness thus makes it possible to increase or reduce the percentage of the thickness of the wall consisting of oriented platelets of boron nitride.

In one embodiment, the wall does not comprise a central stratum and practically all the orientable, preferably anisotropic ceramic grains are arranged in an ordered manner. Preferably said wall is made up of more than 20 layers, or even of more than 30 layers of orientable, preferably anisotropic ceramic grains.

The thickness "e" of the wall and the orientable ceramic grains are preferably such that $e<25.L_{50}$, preferably $e<20.L_{50}$, preferably $e<16.L_{50}$, preferably $e \leq 15.L_{50}$.

In one embodiment, the wall comprises a single stratum consisting of a layer of orientable, preferably anisotropic, ceramic grains or by a stack of at least 2 layers of orientable, preferably anisotropic, ceramic grains, preferably from 2 to 10, or even from 2 to 20, or even from 2 to 50 layers of orientable, preferably anisotropic ceramic grains.

Preferably at least 70%, preferably at least 80%, preferably at least 90%, preferably at least 95%, preferably substantially 100% by number of the grains of said single stratum are roughly parallel to one another and roughly parallel to the outside surface of said wall.

Preferably, the orientable ceramic grains constituting the single stratum are platelets or rodlets.

Preferably, over the width of a median cross-section of a pore, the number of superposed grains (according to the thickness) is roughly constant. Preferably, the number of superposed grains varies by plus or minus 10% relative to the average number of superposed grains.

Preferably, when observed in a median cross-section, a truncated tubular pore has a flattened section, and more than 80% by number of the grains of a portion of wall extending between two flattened adjacent pores are stacked flat on top of one another.

A product comprising such walls displays an optimized response of the oriented function.

In a wall located between the truncated tubular pores of a product according to the invention, preferably more than 10%, preferably more than 20%, preferably more than 30%, preferably more than 50%, preferably more than 70% preferably more than 80%, preferably more than 90% by number of the grains are orientable, preferably anisotropic ceramic grains.

In a wall located between the truncated tubular pores of a product according to the invention, the areal fraction of the orientable ceramic grains, measured on a median cross-section, preferably represents more than 10%, preferably more than 20%, or even more than 30% of the total area of said wall. In a preferred embodiment, the complement to said areal fraction of the orientable ceramic grains is the porosity.

In one embodiment, the walls (i.e. the material between the truncated tubular pores) of the product according to the invention are macroporous (the porosity of the walls being typically greater than or equal to 10 vol %). The open porosity of the walls between the truncated tubular pores is preferably above 30%, or even above 40% and/or below 90%, preferably below 80%, preferably below 70%, or even below 60%, or even below 50%. Advantageously, the mechanical properties are improved thereby.

EXAMPLES

The examples not according to the invention are referenced with (*).

The products in the examples were manufactured by a process according to the invention.

The following raw materials were used:
Powder of platelets of hexagonal boron nitride Très BN PUHP 3016, marketed by the company Saint-Gobain, having a median size equal to 16 μm and a specific surface equal to 2 m$^2$/g,
Powder of platelets of hexagonal boron nitride Très BN PUHP 500, marketed by the company Saint-Gobain, having a median size equal to 6 μm and a specific surface equal to 7 m$^2$/g,
Alumina powder TM-DAR Taimicron marketed by the company Krahn Chemie GmbH,
Powder of alumina platelets RonaFlair White Sapphire marketed by the company Merck,
Colloidal solution of silica Nexsil 20K marketed by the company NYACOL,
Powders of $K_2CO_3$, $Na_2CO_3$, $Nb_2O_5$, $Bi_2O_3$ marketed by the company Sigma-Aldrich,
Powder of copper oxide (CuO) marketed by Sigma-Aldrich,
Powder of calcium nitrate marketed by the company Sigma-Aldrich,
Polyethylene glycol PEG20M marketed by the company Merck,
Solution of Darvan 811 marketed by the company Vanderbilt,
Powder of Darvan 7NS marketed by the company VanderBilt,
Powder of Tylose H4000P2 marketed by Shin-Etsu,
Solution of polyethylene glycol 4000, or PEG4000, with a proportion of active substance equal to 32%,
Sucrose powder marketed by Sigma-Aldrich,
NaCl powder marketed by Sigma-Aldrich,
Zirconium acetate, diluted to 22 wt % in acetic acid marketed by the company Saint-Gobain,
Calcium carbonate powder $CaCO_3$ of purity greater than or equal to 99%, marketed by Sigma-Aldrich,
Carbopol EDT 2691 powder marketed by the company Lubrizol.

The following methods were used for characterization:

The average equivalent diameter of the cross-sections of the pores is measured by the following method:

The sample to be analysed is infiltrated with a resin, for example an epoxy resin. A section is prepared, at mid-length of the truncated tubular pores, perpendicularly to the direction of solidification, and then polished in order to obtain a good surface state, said polishing being carried out at least with a grade 1200 paper, preferably with a diamond paste. Images are recorded using a scanning electron microscope (SEM), preferably in a mode using backscattered electrons (BSE mode) in order to obtain a very good contrast between the ceramic phase and the resin. Each image has at least 1280×960 pixels, excluding the scale bar. The magnification used is such that the width of the image is between 50 times and 100 times the average pore size. A first image may be recorded based on a visual estimate of the average pore size.

The average pore size is determined by analysis of these images by the erosion/dilatation method described in "Characterization of the morphology of cellular ceramics by 3D image processing of X-ray tomography", Maire et al., J. Eur. Ceram. Soc., 27[4] 1973-1981 (2007).

The thickness of the walls, e, of a product is measured by the following method. If the product is a non-sintered product, a sample of said product is broken in a direction perpendicular to the direction of the length of the truncated tubular pores. At least a portion of the sample must have a surface not modified by an external action after rupture, to avoid altering the orientation of the grains. If the product is a sintered product, then a slice of said product to be analysed is cut perpendicularly to the direction of the length of the truncated tubular pores. Images are recorded using a scanning electron microscope (SEM). Each image has at least 1280×960 pixels, excluding the scale bar. The magnification is such that the width of the image allows between 2 and 50 pores to be imaged.

The average thickness of the walls is then measured by analysis of these images using the Fiji software, plotting lines delimiting the walls laterally and then using the tool "Analyse>Measure" of said software; the column "length" of the result table gives the average thickness of the walls. The correspondence between pixel and unit of length may be obtained beforehand using the tool "Set Scale" and measuring the number of pixels of the scale bar.

The thickness W1, length L or D, and elongation factor R of the particles, as well as the average thickness $W1_{50}$ and the average elongation factor Rm of the powder of particles are measured by the following method. Some powder of particles is suspended in ethanol, thoroughly dispersing the particles. This suspension is then spread on a conductive support, such as carbon adhesive tape used in electronic imaging. At least 5 images are recorded using a scanning electron microscope (SEM), each image having as a minimum 1280×960 pixels, excluding the scale bar. The magnification is such that the width of the image makes it possible to visualize between 2 and 20 individual particles, i.e. not agglomerated. If this is not the case, it is necessary to begin again with a suspension having a lower ratio of volume of particles to volume of ethanol. The image must have particles whose thickness appears as roughly parallel to the plane of imaging.

The thickness of the particles, W1, is then measured by analysis of said images using the Fiji software, plotting lines delimiting the particles and then using the tool "Analyse>Measure" of said software. The column "length" in the result table gives the average thickness of the walls.

The correspondence between pixel and unit of length may be obtained beforehand using the tool "Set Scale" and measuring the number of pixels of the scale bar. The average thickness of the particles of the powder, $W1_{50}$, is the mean value of the measured thicknesses W1.

The length of each particle is also measured. The elongation factor, R, equal to the length of the particle divided by the width of said particle, is calculated, as well as the average elongation factor, Rm, of the powder of particles, equal to the arithmetic mean of the elongation factors R.

The alignment of the grains in the walls of a product is measured by the following method. If the product is a non-sintered product, a sample of said product is broken in a direction perpendicular to the direction of the length of the truncated tubular pores. At least a portion of the sample must have a surface not modified by an external action after rupture, in order to avoid altering the orientation of the grains. If the product is a sintered product, then a slice of said product to be analysed is cut perpendicularly to the direction of the length of the truncated tubular pores, and then undergoes a thermal treatment with the aim of revealing the grain boundaries. Images are recorded using a scanning electron microscope (SEM). Each image has at least 1280× 960 pixels, excluding the scale bar. The magnification is such that the height of the image is equal to the size of a wall of thickness e. The orientation of the grains is then measured by means of the tool "Analyse>Directionality" of the Fiji software, selecting the method of measurement "Local Gradient Orientation", "Nbins" equal to 90 and "Histogram Start" equal to −90°. The two quantities in this characterization are the "Dispersion", which quantifies the angular dispersion of the alignment in the image and the quantity "amount", which quantifies the fraction of the image having a preferential alignment.

The absolute density of the material making up the product is the ratio equal to the mass of dry matter of said material after grinding to fineness such that practically no closed pore remains, divided by the volume of this mass after grinding. It may be measured with a helium pycnometer.

Figure 29:
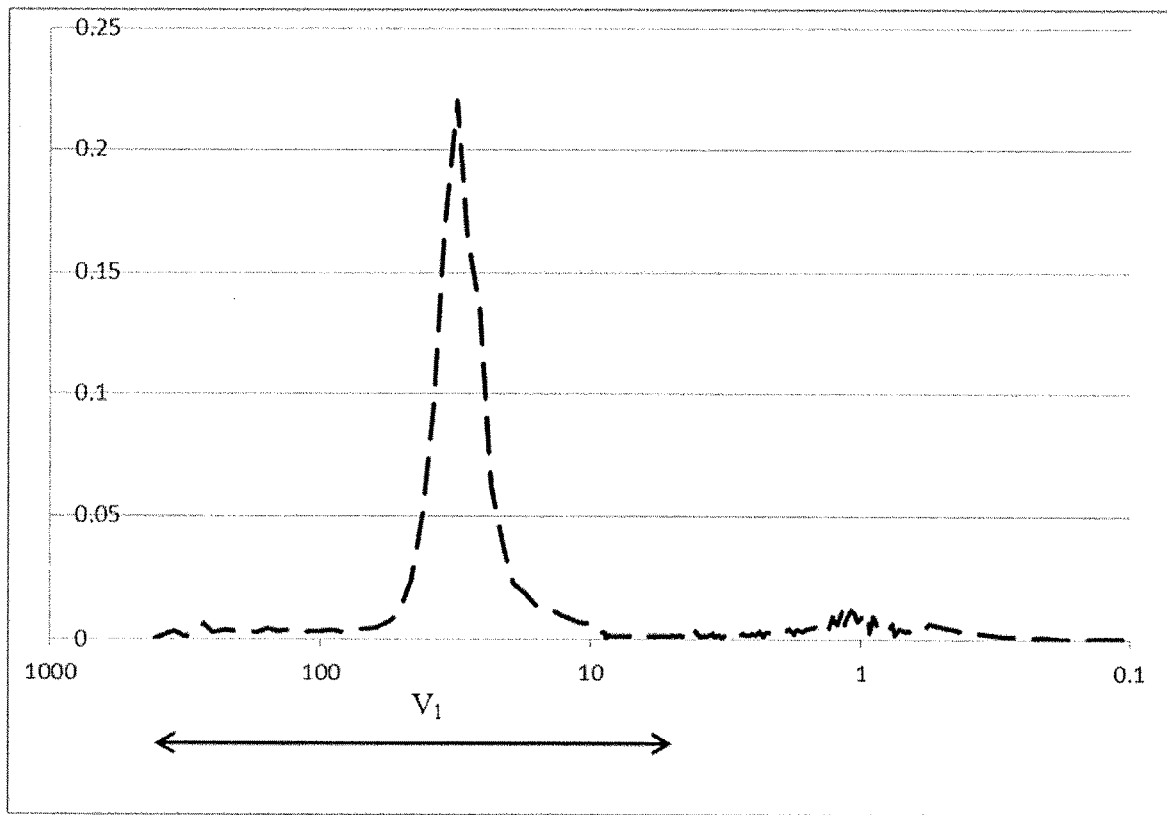
FIG. 29 shows the curve of mercury porosity measurement carried out on the product of example 5.

The open porosity in the walls is measured by mercury porosimetry. A sintered sample of known mass and absolute density is put in a penetrometer suitable for the size and the volume of the porosity to be measured. The minimum pressure to be applied to the mercury is adjusted so as to be able to force the mercury into pores with sizes at least fifteen times less than the median length of the grains in the sample. As shown in FIG. 29, in which the abscissa shows the diameter of the pores in microns and the ordinate shows the volume of mercury introduced in mL/g, a main peak is obtained corresponding to the truncated tubular macroporosity and other peaks whose sum corresponds to the volume of the open pores in the walls. The volume of mercury used for filling the open porosity in the walls is calculated from the following formula: Volume of mercury in the open porosity of the walls=Total volume of mercury introduced−Volume of mercury $V_1$ introduced in the sample corresponding to the main peak.

The percentage open porosity in the walls of the sample may then be calculated from the following formula:

100×Volume of mercury in the open porosity of the walls/[(Volume of mercury in the open porosity of the walls+(Mass of the sample/Absolute density of the sample)].

The relative apparent density of the walls is equal to (100−open porosity in the walls).

The fracture toughness and crack propagation strength measurements are carried out at room temperature, as described in «Strong, tough and stiff bioinspired ceramics from brittle constituents-supplementary information», Bouville et Al., Nature Materials, Vol. 13, pages 508-514 (2014), hereby incorporated by reference.

The products in examples 1, 2, and 3 are boron nitride products, manufactured by the following process.

In step a), the mixtures given in Table 1 (in percentages by volume based on the total volume of each of the slips prepared) were stirred in a beaker using a magnetic stirrer for 5 hours.

TABLE 1

| Example | | 1(*) | 2(*) | 3(*) |
|---|---|---|---|---|
| Ceramic powder | Très BN PUHP 3016 | 18.5 | | |
| | Très BN PUHP 500 | | 18.6 | |
| | Très BN PUHP 3008 | | | 17.4 |
| PEG 4000 solution | | 0.8 | 0.9 | 0.8 |
| Ethanol | | 2.7 | 2.7 | 2.1 |
| Tylose H 4000 P2 | | 0.8 | 0.8 | 0.8 |
| Deionized water | | 77.2 | 77.0 | 78.9 |
| vol % of ceramic particles based on the volume of the slip | | 18.5 | 18.6 | 17.4 |
| % of orientable particles, based on the volume of ceramic powder | | Roughly 100 | Roughly 100 | Roughly 100 |
| Median length $L'_{50}$ of the orientable ceramic particles (μm) | | 16 | 6 | 8 |
| Average elongation factor Rm of the powder of orientable particles | | 16 | 24 | 16 |
| Average thickness of the orientable ceramic particles $W1_{50}$ (μm) | | 1 | 0.25 | 0.54 |

Then each slip obtained was treated ultrasonically, as follows: the vessel containing the suspension is put in a water-filled tank of a Digital Sonifier 250 ultrasonic apparatus, marketed by the company Branson. The intensity of the ultrasound was set to 50% of the maximum intensity, i.e. setting at a power equal to 100 W. Ultrasound was applied for 1.5 s, then stopped for 1.5 s, this cycle being repeated for 14 minutes, after which the water in the tank reached a temperature of 30° C. The energy applied to the suspension was between 150 and 160 Wh/kg of suspension.

The suspension was then stirred with a magnetic stirrer for 12 hours.

In step b), each slip was poured into a mould, the bottom of which was in contact with a copper plate cooled by a refrigerated liquid. The cooling rate of the copper plate controls the velocity of displacement of the solidification front Vp in the suspension.

In step c), for examples 1 and 2, the slip was submitted to oriented freezing with a freezing rate equal to −1° C./min or a velocity of displacement of the solidification front roughly equal to 15 μm/s, and for example 3, the slip was frozen at a rate of −0.5° C./min, leading to a velocity of displacement of the solidification front roughly equal to 8 μm/s. After mould release in step d), sublimation in step e) was carried out by placing the block of frozen slip in a lyophilizer for 48 h at a pressure of 0.42 mbar.

The products in examples 1, 2 and 3 did not undergo other steps.

The alumina product in example 4 was produced as follows: the constituents shown in Table 2 below were mixed for 6 hours in a drum grinder so as to form a slip:

TABLE 2

| Constituents | vol % as percentages of the volume of the slip Example 4 |
|---|---|
| First particulate fraction: RonalFlair White Sapphire powder | 1.3 |
| Second particulate fraction: TM-DAR powder | 11.9 |
| PEG 20M | 1.5 |
| Darvan 811 | 2.6 |
| Sucrose | 3.3 |
| Nexsil 20K | 0.6 |
| Calcium nitrate | 0.1 |
| Deionized water | 78.7 |
| vol % of the ensemble of ceramic particles, based on the volume of slip | 13.2 |
| vol % represented by the first particulate fraction, based on the volume of ceramic powder | 10 |
| Median length $L'_{50}$ of the first particulate fraction (μm) | 9 |
| Average elongation factor Rm of the first particulate fraction | 18 |
| Average thickness $W1_{50}$ of the first particulate fraction (μm) | 0.5 |
| vol % represented by the second particulate fraction, based on the volume of ceramic powder | 90 |
| Median length $D_{50}$ of the second particulate fraction (μm) | 0.1 |

Steps b) to e) of preparation of the product in example 4 are identical to those for preparation of the products in examples 1, 2 and 3, apart from in step c) where the slip was submitted to oriented freezing with a freezing rate equal to −1° C./min, or a velocity of displacement of the solidification front roughly equal to 15 μm/s.

The product in example 4 was then submitted to a sintering step with the following cycle:

Temperature rise of 50° C./h up to 490° C., plateau of 1 h at 490° C., temperature rise of 30° C./h up to 550° C., plateau of 30 minutes at 550° C., temperature rise of 300° C./h up to 1550° C., plateau of 1.5 h at 1550° C., temperature decrease at a rate of 300° C./h to room temperature.

After making samples of the product in example 4, these were submitted to a thermal treatment according to the following cycle: temperature rise of 300° C./h up to 1450° C., plateau of 20 minutes at 1450° C., temperature decrease at a rate of 300° C./h to room temperature.

The results obtained are shown in Table 3 below:

TABLE 3

| Example | 1(*) | 2(*) | 3(*) | 4 |
|---|---|---|---|---|
| Thickness of the walls, e (μm) | 21 | 28 | 29 | 7 |
| Amount (%) | 79 | 63 | 70 | 53 |
| Dispersion (°) | 20.92 | 19.91 | 23.38 | 11.29 |

The products in examples 1 to 4 have a remarkable amount of orientable grains that are oriented in a preferential direction.

The products in examples 5 on the one hand and 6 and 7 on the other hand were prepared as follows: the constituents shown in Table 4 below were mixed for 6 hours in a drum grinder so as to form a slip:

TABLE 4

| Constituents | vol % as percentages of the volume of the slip | | |
|---|---|---|---|
|  | Example 5 | Example 6 | Example 7 |
| First particulate fraction: RonalFlair White Sapphire powder | 12.5 | 11.5 | 11.4 |
| Second particulate fraction: colloidal solution of silica Nexsil 20K | 0 | 0.5 | 1.1 |
| PEG 20M | 2.1 | 1.8 | 1.9 |
| Zirconium acetate (22% solution) | 8.4 | 7.5 | 7 |
| Calcium nitrate | 0 | 0.5 | 1.1 |
| Deionized water | 77.1 | 78.2 | 77.5 |
| Median length $L'_{50}$ of the first particulate fraction (μm) | 9 | 9 | 9 |
| Average elongation factor Rm of the first particulate fraction | 18 | 18 | 18 |
| Average thickness $W1_{50}$ of the first particulate fraction (μm) | 0.5 | 0.5 | 0.5 |

Steps b) to e) of preparation of the products in examples 5, 6 and 7 are identical to those for preparing the products in examples 1, 2 and 3, apart from in step c) where the slip was submitted to oriented freezing with a freezing rate equal to −2° C./min, or a velocity of displacement of the solidification front roughly equal to 25 μm/s.

The products in examples 5, 6 and 7 were then submitted to a sintering step with the following cycle:

Temperature rise of 50° C./h up to 550° C., plateau of 2 h at 550° C., temperature rise of 300° C./h up to 1550° C., plateau of 2 h at 1550° C., temperature decrease at a rate of 300° C./h to room temperature.

The results for mechanical characterization are given in the following Table 5:

TABLE 5

| Example | 5(*) | 6 | 7 |
|---|---|---|---|
| Absolute density of the material (g/cm$^3$) | 3.9 | 3.82 | 3.74 |
| Open porosity in the walls (%) | 59.6 | 17.8 | 4.4 |
| Relative apparent density of the walls (%) | 40.4 | 82.2 | 95.6 |

The open porosity in the walls is remarkably lower for the products in examples 6 and 7. The relative apparent density in the walls is remarkably higher for the products in examples 6 and 7.

The product in example 8 was prepared as follows.

A powder of KNN ($K_{0.5}Na_{0.5}NbO_3$) was synthesized starting from the precursors $K_2CO_3$, $Na_2CO_3$, $Nb_2O_5$ by mixing $K_2CO_3$, $Na_2CO_3$ and $Nb_2O_5$ in molar proportions 1:1:2 in ethanol in a drum grinder for three days. The suspension obtained was then dried until the solvent had evaporated completely and was then submitted to the following cycle of thermal treatment: temperature rise at 4° C./min up to 800° C., plateau at 800° C. for 6 hours, then temperature decrease at a natural rate. The powder obtained is in the form of roughly spherical particles with median length $D_{50}$ equal to 0.5 μm.

A powder of NN ($Na_{0.5}NbO_3$) was synthesized starting from the precursors $Na_2CO_3$, $Nb_2O_5$, $Bi_2O_3$ by the method of microcrystalline topochemical conversion: the precursors $Na_2CO_3$, $Nb_2O_5$ and $Bi_2O_3$ were mixed in molar proportions 1.75:2.5:1.25, then NaCl was added at a weight ratio NaCl:

mixture ($Na_2CO_3$, $Nb_2O_5$ and $Bi_2O_3$) equal to 2:1. The whole was then put in ethanol, then ground in a drum grinder for 15 h, and finally mixed for 3 hours in a Turbulat mixer. The mixture obtained was then dried until the solvent had evaporated completely, then treated thermally in the following cycle: temperature rise at 3° C./min up to 700° C., then temperature rise at 4° C./min up to 1125° C., plateau at 1125° C. for 6 hours, then temperature decrease at a rate equal to 1.8° C./min. The powder of $Bi_{2.5}Na_{3.5}Nb_5O_{18}$ obtained was then washed several times with hot water to remove the salt NaCl added previously. $Na_2CO_3$ in molar proportions 1:0.75 relative to $Bi_{2.5}Na_{3.5}Nb_5O_{18}$ was mixed with salt NaCl at a weight ratio salt: mixture ($Na_2CO_3$, $Bi_{2.5}Na_{3.5}Nb_5O_{18}$) equal to 1.5:1. The mixture obtained was put in ethanol and ground in a drum grinder for 14 hours, then the particles of $Bi_{2.5}Na_{3.5}Nb_5O_{18}$ were added to the suspension, and the whole was ground in a rotating drum grinder for 5 hours. The mixture obtained was then dried until the solvent had evaporated completely, then treated thermally in the following cycle: temperature rise at 4° C./min up to 975° C., plateau at 975° C. for 6 hours, then temperature decrease at a rate equal to 1.8° C./min. The powder obtained was washed several times with hot water to remove the NaCl added previously, then it was washed four times with nitric acid to remove the residual bismuth. The final powder of $NaNbO_3$ is in the form of a powder of platelets whose median length $L'_{50}$ is equal to 15 µm and average thickness $W1_{50}$ is equal to 1.5 µm.

In step a), the constituents shown in Table 6 below were then mixed for 12 hours in a drum grinder without powder of NN, then 1 h in a drum grinder with the powder of NN, so as to form a slip:

TABLE 6

| Constituents | vol % as percentages of the volume of the slip Example 8 |
|---|---|
| Second particulate fraction: KNN powder | 12.69 |
| First particulate fraction: NN powder | 1.44 |
| CuO powder | 0.05 |
| Darvan 7NS | 0.16 |
| PEG 20M | 2.54 |
| Sucrose | 2.50 |
| Deionized water | 80.62 |
| vol % of the ensemble of ceramic particles, based on the volume of slip | 14.22 |
| vol % represented by the first particulate fraction, based on the volume of ceramic powder | 10 |
| Median length $L'_{50}$ of the first particulate fraction (µm) | 15 |
| Average elongation factor Rm of the first particulate fraction | 10 |
| Average thickness $W1_{50}$ of the first particulate fraction (µm) | 1.5 |
| vol % represented by the second particulate fraction, based on the volume of ceramic powder | 89.7 |
| Median length $D_{50}$ of the second particulate fraction (µm) | 0.5 |

In step b), the slip was poured into a mould, the bottom of which was in contact with a copper plate cooled by a refrigerated liquid. The cooling rate of the copper plate controls the velocity of displacement of the solidification front Vp in the suspension.

In step c), the slip was submitted to oriented freezing with a freezing rate equal to −1 C/min, or a velocity of displacement of the solidification front roughly equal to 15 µm/s.

After mould release in step d), sublimation in step e) was carried out by putting the block of frozen slip in a lyophilizer for 48 h at a pressure of 0.42 mbar.

The macroporous preform obtained was then put in an alumina crucible, closed, put on a bed of KNN powder and was then submitted to a sintering step with the following cycle: temperature rise at a rate equal to 50° C./h up to 550° C., plateau of 1 hour at 550° C., temperature rise at a rate equal to 4° C./h up to 1115° C., plateau of 4 hours at 1115° C., temperature rise at a rate equal to 1° C./h up to 1125° C., plateau of 3 hours at 1125° C., temperature decrease at a rate equal to 300° C./h to room temperature.

The product in example 8 obtained is a macroporous product of $K_{0.4}Na_{0.6}NbO_3$, having walls consisting of roughly cubic grains.

The products in examples 9 to 11 were prepared as follows: the constituents shown in Table 7 below were mixed for 21 hours in a drum grinder, then RonalFlair White Sapphire powder of

TABLE 7

| Constituents | vol % as percentages of the volume of the slip | | |
|---|---|---|---|
| | Example 9 | Example 10 | Example 11 |
| First particulate fraction: RonalFlair White Sapphire powder | 13.37 | 13.37 | 13.36 |
| Second particulate fraction: TM-DAR Taimicron alumina powder | 0.41 | 0 | 0.41 |
| Second particulate fraction: colloidal solution of silica Nexsil 20K | 0 | 4.07 | 1.15 |
| Calcium carbonate $CaCO_3$ | 0 | 0.15 | 0.02 |
| Carbopol EDT 2691 | 0.13 | 0.13 | 0.13 |
| Darvan 7NS | 0.54 | 0.54 | 0.54 |
| Deionized water | 85.55 | 81.34 | 84.39 |
| vol % of the ensemble of ceramic particles, based on the volume of slip | 13.78 | 14.63 | 13.99 |
| vol % represented by the first particulate fraction, based on the volume of ceramic powder | 97 | 94.1 | 95.4 |
| Median length $L'_{50}$ of the first particulate fraction (µm) | 9 | 9 | 9 |
| Average elongation factor Rm of the first particulate fraction | 18 | 18 | 18 |
| Average thickness $W1_{50}$ of the first particulate fraction (µm) | 0.5 | 0.5 | 0.5 |
| vol % represented by the second particulate fraction, based on the volume of ceramic powder | 3 | 5.9 | 4.6 |
| vol % of glass particles, based on the volume of ceramic powder | 0 | 5.2 | 1.5 |
| vol % of ceramic particles other than the glass particles, based on the volume of ceramic powder | 3 | 0 | 3.1 |
| Median length $D_{50}$ of the glass particles of the second particulate fraction (µm) | — | 0.02 | 0.02 |
| Median length $D_{50}$ of the ceramic particles that are not glass particles or glass precursor particles of the second particulate fraction (µm) | 0.1 | — | 0.1 |

The amounts of colloidal solution of silica Nexsil 20K and of calcium carbonate were determined so that the molar ratio $SiO_2$:CaO is equal to 75:25.

In steps b) and c), each slip was cast and frozen as described in «*Templated grain growth in macroporous mate-* rials», Bouville et Al., J. Am. Ceram. Soc., 1-7 (2014), «experimental procedure» section, hereby incorporated by reference.

Steps d) and e) of preparation of the products in examples 9 to 11 are identical to those for preparing the products in examples 1 and 2.

Samples with a diameter equal to 20 mm, of the products in examples 9 to 11 were then sintered by SPS (Spark Plasma Sintering) at 1500° C. for 5 minutes at a pressure of 100 MPa, with a rate of temperature rise to 1500° C. equal to 100° C./min.

These sintering treatments by SPS were carried out on apparatus of the type HPD 25/2 from the company FCT Systeme GmbH.

The results for mechanical characterization are given in the following Table 8:

TABLE 8

| Example | 9 | 10 | 11 | 12(*) |
|---|---|---|---|---|
| Relative density of the material (%) | 98.9 | 98.4 | 98.8 | 99.8 |
| Three-point bend strength (MPa) | 270 | 340 | 460 | 330 |
| Crack propagation strength $K_{1c}$ (MPa · m$^{1/2}$) | 3.5 | 5.3 | 6.2 | 3.5 |
| Fracture toughness $K_{jc}$ (MPa · m$^{1/2}$) | 10.7 | 5.3 | 22 | 3.5 |

The product according to example 12 not according to the invention is an alumina product having a mean grain size equal to 0.4 µm.

The fracture toughness $K_{jc}$ of the products in examples 9 to 11 is remarkably higher than that of the product in example 12 and the crack propagation strength $K_{1c}$ of the products of examples 10 and 11 is remarkably higher than that of the product of example 12. The three-point bend strength of the products according to examples 9 and 10 is roughly of the same order of magnitude as that of the product in example 12; that of the product in example 11 is remarkably higher.

The products of examples 9 to 11 therefore have a toughness that is remarkably improved compared to the toughness of the alumina product of example 12, while retaining a good three-point bend strength.

The product in example 11 is the preferred product.

The product of example 13 was produced in the same way as the product of example 11, except in step c), where the slip was frozen in the same way as for the product of example 1 (without linear seeding or epitaxial growth). Surprisingly, although manufactured by a simpler process, this example represents an excellent compromise between toughness Kjc and three-point bend strength.

After sintering, the product of example 13 has a relative density equal to 97.5%.

The product according to example 3 was then impregnated with a silicone resin TSE3033 by an impregnation process under vacuum. The resin plus the sample were put inside a polymer mould and then held under vacuum of 0.11 bar for 10 minutes. The vacuum was broken and then restored for a period of 20 minutes. The body thus impregnated with resin was heated in a stove at 110° C. for 2 h in order to complete the crosslinking of the silicone.

The product in the comparative example was made by mixing 18 vol % of powder Trbs BN PUHP 3008 in the resin used for impregnating the product according to example 3. The next steps of the process for making the comparative example were identical to those of the impregnated product in example 3, but without a freezing step, and therefore also without a step of removal of crystals. The amount of particles of boron nitride used in the comparative example is above the percolation threshold. These particles therefore form a continuous network of particles immersed in the resin used.

Thermal diffusivity was then measured by the flash method on each of the two products described above. The following Table 9 presents the results obtained:

TABLE 9

| Example | Product from the comparative example | Impregnated product from example 3(*) |
|---|---|---|
| Thermal diffusivity at 20° C. (mm$^2$/s) | 0.35 | 1.03 |

The impregnated product in example 3, according to the invention, has a thermal diffusivity more than 3 times higher than that of the product in the comparative example, in which the particles are oriented randomly.

As is now clear, the process according to the invention makes it possible to obtain porous products with truncated tubular macropores having a particularly low open wall porosity.

Advantageously, the walls may also display a remarkable orientation of function.

Of course, the invention is not limited to the embodiments given as examples. In particular, several different ceramic powders could be mixed in the slip in step a).

Furthermore, in an embodiment, the products and processes described in FR 12 61786, FR 12 61777 and PCT/IB2013/060700 are excluded from the present invention. In one embodiment, example 4, or indeed each of the examples 1 to 8 described in the present description, are excluded from the present invention. In an embodiment, the second particulate fraction represents more than 91%, or more than 95%, or less than 89%, or less than 85%, of the ceramic particles, in percentage by volume based on the ensemble of ceramic particles. In an embodiment, the slip does not comprise Darvan 7NS or does not comprise PEG 20M

The invention claimed is:

1. Process for manufacturing a product, optionally sintered, said process comprising the following steps:
   a) preparing a slip comprising an ensemble of ceramic particles in suspension in a liquid phase, the ensemble of ceramic particles representing more than 4% and less than 50% of the volume of the slip and comprising:
      a first particulate fraction consisting of orientable particles having a median length $L'_{50}$ and representing more than 1% of the ceramic particles, in percentage by volume based on the ensemble of ceramic particles; and
      a second particulate fraction having a median length $D_{50}$ at least ten times less than $L'_{50}$ and representing more than 1% of the ceramic particles in percentage by volume based on the ensemble of ceramic particles;
   the first and second particulate fractions together representing more than 80% of the ensemble of ceramic particles, in percentage by volume,
   (b) optionally, pouring the slip into a mould and/or removing air bubbles contained in the slip,
   (c) oriented freezing of the slip by displacement of a solidification front so as to form a block of frozen slip, a velocity Vp of the solidification front being less than a velocity of encapsulation of the ceramic particles Vc and adjusted so as to form crystals of solidified liquid phase separated by walls with an average thickness "e" greater than or equal to the average thickness of the orientable ceramic particles $W1_{50}$;

(d) optionally, removing said block from the mould, (e) removing the crystals of solidified liquid phase from said block, optionally removed from the mould so as to obtain a macroporous preform comprising macropores, (f) optionally, removing binder from the macroporous preform obtained at the end of step c), (g) optionally, sintering the macroporous preform so as to obtain a sintered product;

(h) optionally, machining and/or impregnating said sintered product.

2. Process according to claim 1, wherein in step c) the oriented freezing does not comprise a seeding of crystals of linearly solidified liquid phase.

3. Process according to claim 2, wherein in step c) the oriented freezing does not comprise a sequence of an operation of seeding of crystals of linearly solidified liquid phase and an operation of epitaxial growth of said crystals.

4. Process according to claim 1, wherein in step c) the slip is static.

5. Process according to claim 1, comprising the step g) of sintering.

6. Process according to claim 1, wherein the second particulate fraction represents more than 3% of the ceramic particles, in percent by volume based on the ensemble of ceramic particles.

7. Process according to claim 1, wherein the ensemble of ceramic particles comprises more than 80% of the orientable ceramic particles, in percentage by volume based on the ensemble of ceramic particles.

8. Process according to claim 1, wherein the orientable ceramic particles are of a material with oriented function.

9. Process according to claim 1, wherein
the first particulate fraction represents more than 50% of the volume of the ceramic particles, and
the second particulate fraction represents more than 7% of the volume of ceramic particles, and
more than 90 vol % of the particles of the second particulate fraction are not orientable, and
the first and second particulate fractions together represent more than 90% of the volume of the ensemble of ceramic particles, and
a granulometric distribution of the ceramic particles is bimodal, the two principal modes corresponding to the first and second particulate fractions, respectively.

10. Process according to claim 1, wherein
the first particulate fraction represents less than 50% and more than 5% of the volume of the ceramic particles, and
the first particulate fraction has an average elongation factor, Rm, greater than 10, and
more than 90 vol % of the particles of the second particulate fraction are not orientable, and
the first and second particulate fractions together represent more than 90% of the volume of the ensemble of ceramic particles, and
a granulometric distribution of the ceramic particles is bimodal, the two principal modes corresponding to the first and second particulate fractions, respectively.

11. Process according to claim 1, wherein
the first particulate fraction represents more than 80% of the volume of the ceramic particles, and
the particles of the first particulate fraction are of a material with oriented function, and
the second particulate fraction represents less than 20% of the volume of the ensemble of ceramic particles, and
more than 90 vol % of the particles of the second particulate fraction are not orientable, and
the first and second particulate fractions together represent more than 90% of the volume of the ensemble of ceramic particles, and
a granulometric distribution of the ceramic particles is bimodal, the two principal modes corresponding to the first and second particulate fractions, respectively.

12. Process according to claim 1, wherein
the first particulate fraction represents less than 50% and more than 5% of the volume of the ceramic particles, and
the particles of the first particulate fraction are of a material with oriented function, and
more than 90 vol % of the particles of the second particulate fraction are not orientable, and
the first and second particulate fractions together represent more than 95% of the volume of the ensemble of ceramic particles, and
a granulometric distribution of the ceramic particles is bimodal, the two principal modes corresponding to the first and second particulate fractions, respectively,
the process comprising a sintering step g).

13. Process according claim 12, wherein
the first particulate fraction represents less than 15% of the volume of the ceramic particles, and
more than 95 vol % of the particles of the second particulate fraction are not orientable.

14. Process according to claim 1, wherein the orientable ceramic particles are anisotropic particles or multifaceted particles having more than two facets.

15. Process according to claim 1, wherein more than 50% of the orientable particles belong to one and a same shape class, in percentage by volume.

16. Process according to claim 1, wherein a material constituting the orientable ceramic particles, and/or the ceramic particles of the second particulate fraction and/or particles of a fraction complementary to the orientable particles is selected from oxides, nitrides, carbides, carboxynitrides, graphite, graphene and mixtures thereof.

17. Process according to claim 16, wherein said material is selected from the group consisting of un-stabilized or partially stabilized or stabilized zirconium oxide, un-doped or doped yttrium oxide, titanium dioxide, aluminosilicates, cordierite, aluminium oxide, hydrated aluminas, magnesium oxide, talc, nickel oxide, iron oxides, un-doped or doped cerium oxide, oxides with perovskite structure undoped or doped with platinum and/or palladium and/or rhodium and/or gold and/or silver, compounds comprising titanium of a type $La_4Sr_8Ti_{11}Mn_{1-x}Ga_xO_{38}$ with $0 \leq x \leq 1$ and $La_4Sr_8Ti_{12-n}Mn_nO_{38}$ with $0 \leq n \leq 1$, compounds with a structure of a bimevox type, aluminium nitride, boron nitride, silicon nitride, titanium nitride, titanium carbide, silicon carbide, tungsten carbide, zirconium carbide, graphite, graphene, and mixtures thereof.

18. Process according to claim 17, wherein more than 50% of the crystals of solidified liquid phase are parallel to one another.

19. Process according to claim 1, wherein, in step c), conditions of oriented freezing are adjusted to form crystals of solidified liquid phase, having, in a median transverse plane, a width more than 5 times than a thickness of the crystals of solidified liquid phase.

20. Process according to claim 1, comprising a step e') consisting of compressing the block in a direction parallel to a direction of the thickness of the crystals of solidified liquid phase, so as to obtain a block having a relative density above 85%.

21. Process according to claim 20, wherein at least one of the steps of binder removal f) and of sintering g) is performed, the compression step being carried out before and/or jointly with the step of binder removal f) and/or the sintering step g).

22. Process according to claim 1, comprising, at step a), replacing partially or completely the ceramic particles with equivalent amounts of precursors that are transformed into ceramic particles so as to obtain said ensemble of ceramic particles before step c), and/or replacing partially or completely the ceramic particles with equivalent amounts of particles of a same shape of a ceramic precursor that is transformed into ceramic in step f) or g).

\* \* \* \* \*